(12) United States Patent
Lommel et al.

(10) Patent No.: US 11,589,577 B2
(45) Date of Patent: Feb. 28, 2023

(54) NANOTECHNOLOGY SYSTEM FOR AGRICULTURAL APPLICATIONS

(71) Applicant: North Carolina State University, Raleigh, NC (US)

(72) Inventors: Steven A. Lommel, Cary, NC (US); Julie A. Willoughby, Lake Oswego, OR (US); Richard Guenther, Cary, NC (US)

(73) Assignee: North Carolina State University, Raleigh, NC (US)

( * ) Notice: Subject to any disclaimer, the term of this patent is extended or adjusted under 35 U.S.C. 154(b) by 637 days.

(21) Appl. No.: 15/826,163

(22) Filed: Nov. 29, 2017

(65) Prior Publication Data

US 2018/0077926 A1 Mar. 22, 2018

Related U.S. Application Data

(62) Division of application No. 14/380,630, filed as application No. PCT/US2013/036746 on Apr. 16, 2013, now abandoned.

(60) Provisional application No. 61/624,517, filed on Apr. 16, 2012.

(51) Int. Cl.
| | |
|---|---|
| *A01N 25/26* | (2006.01) |
| *A01N 57/30* | (2006.01) |
| *A01N 57/12* | (2006.01) |
| *A01N 47/24* | (2006.01) |
| *A01N 47/22* | (2006.01) |
| *A01N 43/90* | (2006.01) |
| *A01N 25/34* | (2006.01) |
| *A01N 25/28* | (2006.01) |

(52) U.S. Cl.
CPC ............ *A01N 25/26* (2013.01); *A01N 25/28* (2013.01); *A01N 25/34* (2013.01); *A01N 43/90* (2013.01); *A01N 47/22* (2013.01); *A01N 47/24* (2013.01); *A01N 57/12* (2013.01); *A01N 57/30* (2013.01)

(58) Field of Classification Search
None
See application file for complete search history.

(56) References Cited

U.S. PATENT DOCUMENTS

| | | | |
|---|---|---|---|
| 1,962,806 A | 6/1934 | Clapp | |
| 5,251,398 A * | 10/1993 | Balassa | A01N 25/10 |
| | | | 47/2 |
| 2003/0017208 A1 | 1/2003 | Ignatious | |
| 2004/0070093 A1 | 4/2004 | Mathiowitz et al. | |
| 2004/0076681 A1 | 4/2004 | Dennis et al. | |
| 2006/0263417 A1* | 11/2006 | Lelkes | A61L 27/26 |
| | | | 424/443 |
| 2010/0210465 A1 | 8/2010 | Li | |
| 2010/0216211 A1* | 8/2010 | Shauer | A61L 27/20 |
| | | | 435/183 |
| 2011/0275520 A1* | 11/2011 | Frey | C08J 3/21 |
| | | | 504/360 |
| 2012/0015020 A1 | 1/2012 | Pourdeyhimi et al. | |
| 2012/0039799 A1 | 2/2012 | Franzen et al. | |

FOREIGN PATENT DOCUMENTS

| | | | |
|---|---|---|---|
| CA | 2207227 A1 * | 12/1998 | A01G 20/20 |
| WO | WO-2010099292 A2 * | 9/2010 | A61K 9/70 |

OTHER PUBLICATIONS

Li et al. (Pest Management Science, 2011, 67, 831-836) (Year: 2011).*
Giblin-Davis (Annals of Applied Nematology, 1988, 2, 46-49) (Year: 1988).*
Sciencedirect (Fenamiphos, https://pdf.sciencedirectassets.com/311945/3-s2.0-C20120025689/3-s2.0-B9781455731480000066/main.pdf?X-Amz-Security-Token . . . , 384-388, from Sittig's Handbook of Pesticides and Agricultural Chemicals. (Year: 2015).*
Whitney et al. (Plant Physiology, 1999, 121, 657-663).*
Wu et al. (Langmuir, 2002, 18, 8620-8625) (Year: 2002).*
Mederios et al. (J. of Appl. Polymer Sci., 2009, 113, 2322-2330) (Year: 2009).*
Peteu et. al (Polymers, 2010, 2, 229-251) (Year: 2010).*
Pokorski et al. (Mol. Pharm., 2011, 8(1), 29-43, published online Dec. 2010) (Year: 2010).*
International Search Report and Written Opinion, PCT/US2013/036746, dated Aug. 16, 2013.
Vidaver, Anne K. "Use of antimicrobials in Plant agriculture", *Clinical infectious diseases*, vol. 34, suppl 3, 4 pages (2002).
Peteu, S.F. et al. "Responsive Polymers for Crop Protection", *Polymers*, vol. 2, pp. 229-251 (2010).
Yildiz, I., et al. "Applications of viral nanoparticles in medicine", *Current Opinion in Biotechnology*, vol. 22, pp. 901-908 (2011).
Borovsky, Dov; Nordiie, Tom "Genetic modification turns plant virus into delivery vehicle for green-friendly insecticide, say UF researchres", News: University of Florida, Published Dec. 2006.
Jansson, R., "Potential of Foliar, Dip, and Injection Applications of Avermectins for Control of Plant-Parasitic Nematodes", J. of Nematology, vol. 30, pp. 65-75 (1998).

* cited by examiner

*Primary Examiner* — Erin E Hirt
(74) *Attorney, Agent, or Firm* — Myers Bigel, P.A.

(57) ABSTRACT

A first aspect of the invention is an agricultural composition comprising nanoparticles, an agrochemical active ingredient in the nanoparticles, and optionally (but in some embodiments preferably) a carrier for the nanoparticles. In some embodiments, the nanoparticles are viral particles or capsids, particularly plant viral particles or capsids. In some embodiments, the carrier comprises an inert or biodegradable carrier (e.g., a solid carrier) to which the nanoparticles are bound or in which the nanoparticles are suspended. In some embodiments, the carrier comprises inert or biodegradable polymer fibers.

20 Claims, 6 Drawing Sheets

NANOTECHNOLOGY SYSTEM FOR AGRICULTURAL APPLICATIONS

RELATED APPLICATIONS

This application is a divisional application of U.S. application Ser. No. 14/380,630, filed on Aug. 22, 2014, which is a 35 U.S.C. § 371 national stage application of PCT Application No. PCT/US2013/036746, filed on Apr. 16, 2013, which claims the benefit of U.S. Provisional Application No. 61/624,517, filed on Apr. 16, 2012, the contents of which are incorporated herein by reference in their entireties. The above-referenced PCT International Application was published as international Publication No. WO 2013/158620 A1 on Oct. 24, 2013.

FIELD OF THE INVENTION

The present invention concerns methods and compositions for treating plants with agricultural active agents such as nematicides.

BACKGROUND OF THE INVENTION

Plant parasitic nematodes are one of the world's major agricultural pests, causing in excess of $125 billion in worldwide crop damage annually. As these parasitic roundworms attack crop root systems, they feed upon crucial growth nutrients reducing crop yields. The surviving plants also are more vulnerable to secondary infections, drought, and lodging due to severely compromised root systems. The phylum Nematoda includes cosmopolitan plant parasites that impact virtually every crop plant in every agricultural setting. On some crops, such as soybean, nematodes are clearly recognized as the major pest. Nematode-infected crops with major economic losses include soybeans, potatoes, bananas, cotton, corn, citrus, strawberries, tomatoes, coffee, carrots, peppers, turf, and greenhouse ornamentals.

The majority of nematicides comprise highly toxic contact and fumigant pesticides that are either heavily restricted or eliminated entirely for use in the United States by the Environmental Protection Agency. Similar restrictions have occurred in other countries. Organophosphate and carbamate contact nematicides are non-specific neurotoxins ranking among the most dangerous pesticides for humans, birds, fish, bees, and other non-target organisms. It is clear that an innovative solution to replace the traditional method of nematode control is imperative to the protection of the world food supply chain.

In general, applications of non-fumigant nematicides require 5-8 lbs active ingredient per acre to provide effective nematode control. Large quantities of this active ingredient need to be applied to the soil because only a very minor portion ever comes in contact with the plant roots or the nematodes. In addition, non-target species are also severely impacted by this high application of toxin. Given the toxicity of these agents as noted above, such techniques have severe limitations.

Accordingly, there is a need for new compositions and methods of applying nematicides and other agricultural active agents to the treatment of plants.

SUMMARY OF THE INVENTION

A first aspect of the invention is an agricultural composition comprising, consisting of, or consisting essentially of nanoparticles (e.g., hollow nanoparticles), an agrochemical active ingredient in said nanoparticles, and optionally a carrier for said nanoparticles.

In some embodiments, the nanoparticles are viral particles or capsids, particularly plant viral particles or capsids.

In some embodiments, the viral particle is selected from the group consisting of Tombusviridae, Comaviridae, and Bromoviridae virus particles. Particular examples include, but are not limited to, red clover necrotic mosaic virus, artichoke mottled crinkle virus, carnation Italian ringspot virus, cucumber necrosis virus, cymbidium ringspot virus, eggplant mottled crinkle virus, grapevine Algerian latent virus, lato river virus, Moroccan pepper virus, neckar river virus, pelargonium leaf curl virus, petunia asteroid mosaic virus, sitke waterborne virus, and tomato bushy stunt virus particles.

In some embodiments, the carrier comprises an inert or biodegradable carrier (e.g., a solid carrier) to which said viral nanoparticles are bound or in which said nanoparticles are suspended. In some embodiments, the carrier comprises inert or biodegradable polymer fibers.

In some embodiments, the carrier, or the polymer fibers, comprise a biodegradable polymer selected from the group consisting of cellulose, polyglycolic acid, polylactic acid, polyethylene oxide, polycaprolactone, polyethylenimine-polyethylene glycol, cyclodextrin, ethylene vinyl acetate, poly(L-lysine)-poly(ethylene glycol), polyethylenimine, poly(a[4-aminobutyl]-1-glycolic acid, poly(2-(dimethylamino)ethyl methacrylate, poly (vinyl alcohol), poly(enol-ketone) and N-2-hydroxypropyl) methacrylamide copolymers.

In some embodiments, the nanoparticles are covalently or noncovalently coupled to said polymer fibers (e.g., the nanoparticles comprises cysteine and/or lysine residues to which carrier fibers are covalently linked).

In some embodiments, the carrier further comprises water (e.g., to form an emulsion, suspension, dispersion, latex or the like, with the solid carrier).

In some embodiments, the active ingredient is selected from the group consisting of nematicides, fungicides, herbicides, pesticides, acaricides, rodenticides, plant growth regulators, nutrients, pest repellents, and combinations thereof.

A further aspect of the invention is a method of treating a plant, comprising applying a composition as described herein to the plant in a treatment effective amount. Such plants are generally angiosperms or gymnosperms, and in some embodiments are monocots or dicots. In some embodiments, the plant is wheat, corn (maize), soybean, cotton, cassava, potato, sweet potato, bananas, citrus, strawberries, tomato, coffee, carrots, peppers, turf grass, or greenhouse ornamentals, taro, oats, barley, cereal rye, breadfruit, pea, rice, yams, garbanzo (chickpea), Jerusalem artichoke, or lentil.

The plant may be in the form of a plant is a plant part such as leaves, flowers, stems, roots, tubers, fruits, and seeds.

In some embodiments, the composition is applied in an amount effective to combat nematode parasitism on said plant.

A further aspect of the invention is a plant having a composition as described herein contacted thereto (e.g., the composition coated thereon (such as a seed coating), or the plant at least partially embedded therein). Such plants are, in general, angiosperms or gymnosperm, and in some embodiments monocots or dicots. Such plants may be in the form of a plant part such as leaves, flowers, stems, roots, tubers, fruits, and seeds. In some embodiments, the plant is wheat, corn (maize), soybean, cotton, cassava, potato, sweet potato, bananas, citrus, strawberries, tomato, coffee, carrots, peppers, turf grass, or greenhouse ornamentals.

Without wishing to be limited to any particular theory of the invention, in some embodiments the nanoparticles: reversibly open in vitro for loading with agricultural active agent; advantageously survive substantially intact in soil without releasing their contents; release the active agent from the nanoparticle in the low $Ca^{2+}$ environment of the cytosol in living cells. Thus, as (for example) nematodes or other pests are exposed to the carrier, the nanoparticle is transferred to the most potent location for uptake (the nematode cuticle or surface), increasing active efficacy.

The present invention is explained in greater detail in the following Examples. The disclosures of all US Patent references cited herein are to be incorporated by reference herein in their entirety.

DETAILED DESCRIPTION OF THE PREFERRED EMBODIMENTS

Figures 1A, 1B, 1C, 1D:
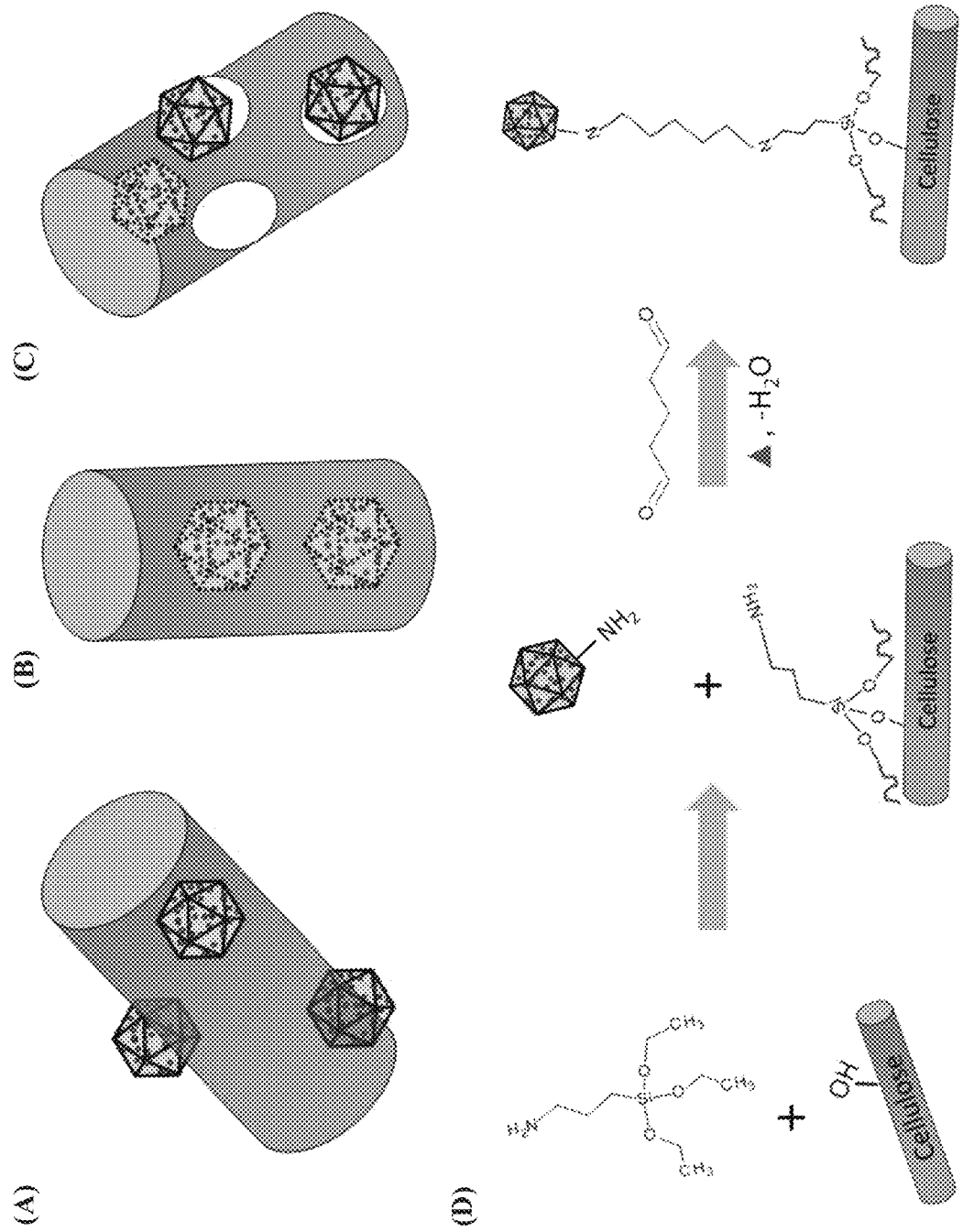
FIGS. 1A-1D. Functionalized PVN fibers via (a) absorption of PVNs onto fibers, (b) embedding of PVNs into the fibers c) encasing of PVNs in porous fibers, and d) covalently bonding PVNs to fibers (e.g., via gluteraldehyde coupling between the amine-functional fiber and amine residue on the PVN).

Certain exemplary embodiments of the present invention are described below and illustrated in the accompanying figures. The embodiments described are only for purposes of illustrating the present invention and should not be interpreted as limiting the scope of the invention, which, of course, is limited only by the claims below. Other embodiments of the invention, and certain modifications and improvements of the described embodiments, will occur to those skilled in the art, and all such alternate embodiments, modifications, and improvements are within the scope of the present invention.

A. Definitions.

"Plant" as used herein generally refers to vascular plants. "Plant" refers to both whole plants and parts thereof, such as stems, leaves, flowers, fruit, tubers, seeds, roots, etc.

"Nematode" as used herein includes, but is not limited to, plant-parasitic nematodes such as Meloidogyne root knot nematodes, Globodera and Heterodera cyst nematodes, Pratylenchus lesion nematodes, Dietylenchus stem and bulb nematodes, Tylenchulus citrus nematodes, Xiphinema dagger nematodes, Radopholus burrowing nematodes, Rotylenchulus reniform nematodes, Helicotylenchus spiral nematodes, and Belonolaimus sting nematodes.

"Cellulose" as used herein includes both natural cellulose (e.g., cotton, wood chips, wood pulp, etc.) and derivatives thereof such as hydroxypropyl cellulose, carboxymethyl hydroxyethyl cellulose, hydroxyethyl cellulose, hydrophobically modified cellulose, and combinations thereof. See, e.g., U.S. Pat. No. 8,138,124.

B. Agrochemical Active Ingredients.

Agrochemical active ingredients that can be used to carry out the present invention are known or will be apparent to those skilled in the art based upon the present disclosure. Examples include, but are not limited to, pesticides (e.g., nematicides, insecticides, acaricides, fungicides, herbicides, etc.) plant growth regulators, nutrients, pest repellents, and the like. See. e.g., U.S. patent application Ser. No. 20110200571; see also U.S. Pat. Nos. 8,119,150; 7,836,630; 6,776,996; 6,660,690; 6,638,994; and 6,602,823 (the disclosures of which agrochemical active ingredients found therein are incorporated by reference herein in their entirety). Particular examples include but are not limited to those discussed in greater detail below.

Nematicides.

Examples of nematicides that can be used to carry out the present invention include, but are not limited to, antibiotic nematicides such as abamectin; carbamate nematicides such as benomyl, carbofuran, carbosulfan, and cleothocard; oxime carbamate nematicides such as alanycarb, aldicarb, aldoxycarb, oxamyl; organophosphorous nematicides such as diamidafos, fenamiphos, fosthietan, phosphamidon, cadusafos, chlorpyrifos, dichlofenthion, dimethoate, ethoprophos, fensulfothion, fosthiazate, heterophos, isamidofos, isazofos, methomyl, phorate, phosphocarb, terbufos, thiodicarb, thionazin, triazophos, imicyafos, and mecarphon. Other compounds with nematicidal activity include acetoprole, benclothiaz, chloropicrin, dazomet, DB CP, DCIP, 1,2-dichloropropane, 1,3-dichloropropene, furfural, iodomethane, metam, methyl bromide, methyl isothiocyanate, and xylenols.

Fungicides.

Examples of fungicides that can be used to carry out the present invention include, but are not limited to, aldimorph, ampropylfos, ampropylfos potassium, andoprim, anilazine, azaconazole, azoxystrobin, benalaxyl, benodanil, benomyl, benzamacril, benzamacryl-isobutyl, bialaphos, binapacryl, biphenyl, bitertanol, blasticidin-S, boscalid, bromuconazole, bupirimate, buthiobate, calcium pots sulphide, capsimycin, captafol, captan, carbendazim, carboxin, cavort, quinomethionate, chlobenthiazone, chlorfenazol, chloroneb, chloropicrin, chlorothalonil, chlozolinate, clozylacon, cufraneb, cymoxanil, cyproconazole, cyprodinil, cyprofuram, debacarb, dichlorophen, diclobutrazole, diclofluanid, diclomezine, dicloran, diethofencarb, difenoconazole, dimethirimol, dimethomorph, dimoxystrobin, diniconazole, diniconazole-M, dinocap, diphenylamine, dipyrithione, ditalimfos, dithianon, dodemorph, dodine, drazoxolon, edifenphos, epoxiconazole, etaconazole, ethirimol, etridiazole, famoxadon, fenapanil, fenarimol, fenbuconazole, fenfuram, fenitropan, fenpiclonil, fenpropidin, fenpropimorph, fentin acetate, fentin hydroxide, ferbam, ferimzone, fluazinam, fludioxonil flumetover, fluoromide, fluquinconazole, flurprimidol, flusulfamide, flutolanil, flutriafol, folpet, fosetyl-aluminium, fosetyl-sodium, fthalide, fuberidazole, furalaxyl, furametpyr, furcarbonil, furconazole, furconazole-cis, furmecyclox, guazatine, hexachlorobenzene, hexaconazole, hymexazol, imazalil, imibenconazole, iminoctadine, iminoctadine albesilate, iminoctadine triacetate, iodocarb, ipconazole, iprohenfos (IBP), iprodione, irumamycin, isoprothiolane, isovaledione, kasugamycin, kresoxim-methyl, copper preparations, such as: copper hydroxide, copper naphthenate, copper oxychloride, copper sulphate, copper oxide, oxine-copper and Bordeaux mixture, mancopper, mancozeb, maneb, meferimzone, mepanipyrim, mepronil, metalaxyl, metconazole, methasulfocarb, methfuroxam, metiram, metomeclam, metsulfovax, mildiomycin, myclobutanil, myclozolin, nickel dimethyldithiocarbamate, nitrothal-isopropyl, nuarimol, ofurace, oxadixyl, oxamocarb, oxolinic acid, oxycarboxim, oxyfenthiin, paclobutrazole, pefurazoate, penconazole, pencycuron, phosdiphen, pimaricin, piperalin, polyoxin, polyoxorim, probenazole, prochloraz, procymidone, propamocarb, propanosine-sodium, propiconazoie, propineb, prothiocinazole, pyraclostrobin, pyrazophos, pyrifenox, pyrimethanil, pyroquilon, pyroxyfur, quinconazole, quintozene (PCNB), sulphur and sulphur preparations, tebuconazole, tecloftalam, tecnazene, tetcyclasis, tetraconazole, thiabendazole, thicyofen, thifluzamide, thiophanate-methyl, thiram, tioxymid, tolclofos-methyl, tolylfluanid, triadimefon, triadimenol, triazbutil, triazoxide, trichlamide, tricyclazole, tridemorph, trifloxystrobin, triflumizole, triforine, triticonazole, uniconazole, validamycin A, vinclozolin, viniconazole, zarilamide, zineb, ziram and also Dagger G, OK-8705, OK-8801,.alpha.-(1,1-dimethylethyl)-.beta.-(2-phenoxyethyl)-1H-1,2,4-triazol e-1-e-thanol,.alpha.-(2,4-dichlorophenyl)-.beta.-fluoro-.beta.-propyl-1H-1,2,4-triazole-1-ethanol,.alpha.-(2, 4-dichlorophenyl)-.beta.-methoxy-.alpha,1,2,4-triaz-ole-1-ethanol,.alpha.-(5-methyl-1,3-dioxan-5-yl)-.beta.-[[4-(trifluoromethyl)-phenyl]-m-ethylene]-1H-1,2,4-triazole-1-ethanol, (5RS,6RS)-6-hydroxy-2,2,7,7-tetramethyl-5-(1H-1,2,4-triazol-1-yl)-3-octan-one, (E)-.alpha.-(methoxyimino)-N-methyl-2-phenoxy-phenylacetamide, 1-isopropyl {2-methyl-1-[[[1-(4-methylphenyl)-ethyl]-amino]-carbonyl]-prop-yl}carbamate, 1-(2,4-dichlorophenyl)-2-(1H-1,2,4-triazol-1-yl)-ethanone-O-(phenylmethyl-)-oxime, 1-(2-methyl-1-naphthalenyl)-1H-pyrrole-2,5-dione, 1-(3,5-dichlorophenyl)-3-(2-propenyl)-2,5-pyrrolidindione, 1-[(diiodomethyl)-sulphonyl]-4-methyl-benzene,1-[[2-(2,4-dichlorophenyl)-1,3-dioxolan-2-yl]-methyl]-1H-imidazole, 1-[[2-(4-chlorophenyl)-3-phenyloxiranyl]-methyl]-1H-1,2,4-triazole, 1-[1-[2-[(2,4-dichlorophenyl)-methoxy]-phenyl]-ethenyl]-1H-imidazole, 1-methyl-5-nonyl-2-(phenylmethyl)-3-pyrrolidinole, 2',6'-dibromo-2-methyl-4'-trifluoromethoxy-4'-trifluoro-methyl-1,3-thiazo-1e-5-carboxanilide, 2,2-dichloro-N-[1-(4-chlorophenyl)-ethyl]-1-ethyl-3-methyl-cyclopropaneca-rboxamide, 2,6-dichloro-5-(methylthio)-4-pyrimidinyl-thiocyanate, 2,6-dichloro-N-(4-trifluoromethylbenzyl)-benzamide, 2,6-dichloro-N-[[4-(trifluoromethyl)-phenyl]-methyl]-benzamide, 2-(2,3,3-triiodo-2-propenyl)-2H-tetrazole, 2-[(1-methylethyl)-sulphonyl]-5-(trichloromethyl)-1,3,4-thiadiazole, 2-[[6-deoxy-4-O-(4-O-methyl-.beta.-D-glycopyranosyl)-.alpha.-D-glucopyran-osyl]-amino]-4-methoxy-1H-pyrrolo[2,3-d] pyrimidine-5-carbonitrile, 2-aminobutane, 2-bromo-2-(bromomethyl)pentanedinitrile, 2-chloro-N-(2,3-dihydro-1,
1,3-trimethyl-1H-inden-4-yl)-3-pyridinecarboxam-ide, 2-chloro-N-(2,6-dimethylphenyl)-N-(isothiocyanatomethyl)-acetamide, 2-phenylphenol (OPP), 3,4-dichloro-1-[4-(difluoromethoxy)-phenyl]-1H-pyrrole-2,5-dione, 3,5-dichloro-N-[cyano[(1-methyl-2-propynyl)-oxy]-methyl]-benzamide, 3-(1,1-dimethylpropyl-1-oxo-1H-indene-2-carbonitrile, 3-[2-(4-chlorophenyl)-5-ethoxy-3-isoxazolidinyl]-pyridine, 4-chloro-2-cyano-N,N-dimethyl-5-(4-methylphenyl)-1H-imidazole-1-sulphonam-ide, 4-methyl-tetrazolo[1,5-a]quinazolin-5(4H)-one, 8-(1,1-dimethylethyl)-N-ethyl-N-propyl-1,4-dioxaspiro[4,5]decane-2-methan-amine, 8-hydroxyquinoline sulphate, 9H-xanthene-2-[(phenylamino)-carbonyl]-9-carboxylic hydrazide, bis-(1-methylethyl)-3-methyl-4-[(3-methylbenzoyl)-oxy]-2,5-thiophenedicar-boxylate, cis-1-(4-chlorophenyl)-2-(1H-1,2, 4-triazol-1-yl)-cycloheptanol, cis-4-[3-[4-(1,1-dimethylpropyl)-phenyl-2-methylpropyl]-2,6-dimethyl-morp-holine hydrochloride, ethyl [(4-chlorophenyl)-azo]-cyanoacetate, potassium bicarbonate, methanetetrathiol-sodium salt, methyl 1-(2,3-dihydro-2,2-dimethyl-1H-inden-1-yl)-1H-imidazole-5-carboxylate, methyl N-(2,6-dimethylphenyl)-N-(5-isoxazolylcarbonyl)-DL-alaninate, methyl N-(chloroacetyl)-N-(2,6-dimethylphenyl)-DL-alaninate, N-(2,3-dichloro-4-hydroxyphenyl)-1-methyl-cyclohexanecarboxamide, N-(2,6-dimethylphenyl)-2-methoxy-N-(tetrahydro-2-oxo-3-furanyl)-acetamide-, N-(2,6-dimethylphenyl)-2-methoxy-N-(tetrahydro-2-oxo-3-thienyl)-acetamid-e, N-(2-chloro-4-nitrophenyl)-4-methyl-3-nitro-benzenesulphonamide, N-(4-cyclohexylphenyl)-1,4, 5,6-tetrahydro-2-pyrimidinamine, N-(4-hexylphenyl)-1,4,5, 6-tetrahydro-2-pyrimidinamine, N-(5-chloro-2-methylphenyl)-2-methoxy-N-(2-oxo-3-oxazolidinyl)-acetaimide, N-(6-methoxy)-3-pyridinyl)-cyclopropanecarboxamide, N-[2,2,2-trichloro-1-[(chloroacetyl)-amino]-ethyl]-benzamide, N-[3-chloro-4,5-bis(2-propinyloxy)-phenyl]-N'-methoxy-methanimidamide, N-formyl-N-hydroxy-DL-alanine-sodium salt, O,O-diethyl [2-(dipropylamino)-2-oxoethyl]-ethylphosphoramidothioate, O-methyl S-phenyl phenylpropylphosphoramidothioate, S-methyl 1,2,3-benzothiadiazole-7-carbothioate, spiro[2H]-1-benzopyrane-2,1'(3'H)-isobenzofuran]-3'-one, and Trilex-Yield Shield (Bayer CropScience) alone or in combination.

Insecticides.

Examples of insecticides that can be used to carry out the present invention include, but are not limited to, neonicotinoid insecticides such 1-(6-chloro-3-pyridylmethyl)-N-nitroimidazolidin-2-ylideneamine (imidacloprid), 3-(6-chloro-3-pyridylmethyl)-1,3-thiazolidin-2-ylidenecyanamide (thiacloprid), 1-(2-chloro-1,3-thiazol-5-ylmethyl)-3-methyl-2-nitroguanidine (clothianidin), nitempyran, N.sup.1-[(6-chloro-3-pyridyl)methyl]-N.sup.2-cyano-N.sup.1-methylacetamid-ine (acetamiprid), 3-(2-chloro-1,3-thiazol-5-ylmethyl)-5-methyl-1,3,5-oxadiazinan-4-ylidene(-nitro)amine (thiamethoxam) and 1-methyl-2-nitro-3-(tetrahydro-3-furylmethyl)guanidine (dinotefuran).

Herbicides.

Suitable herbicides that can be used to carry out the present invention include, but are not limited to: amide herbicides such as allidochlor, beflubutamid, benzadox, benzipram, bromobutide, cafenstrole, CDEA, chlorthiamid, cyprazole, dimethenamid, dimethenamid-P, diphenamid, epronaz, etnipromid, fentrazamide, flupoxam, fomesafen, halosafen, isocarbamid, isoxaben, napropamide, naptalam, pethoxamid, propyzamide, quinonamid and tebutam; anilide herbicides such as chloranocryl, cisanilide, clomeprop, cypromid, diflufenican, etobenzanid, fenasulam, flufenacet, flufenican, mefenacet, mefluidide, metamifop, monalide, naproanilide, pentanochlor, picolinafen and propanil; arylalanine herbicides such as benzoylprop, flampropand flamprop-M; chloroacetanilide herbicides such as acetochlor, alachlor, butachlor, butenachlor, delachlor, diethatyl, dimethachlor, metazachlor, metolachlor, S-metolachlor, pretilachlor, propachlor, propisochlor, prynachlor, terbuchlor, thenylchlor and xylachlor; sulfonanilide herbicides such as benzofluor, perfluidone, pyrimisulfan and profluazol; sulfonamide herbicides such as asulam, carbasulam, fenasulam and oryzalin; antibiotic herbicides such as bilanafos; benzoic acid herbicides such as chloramben, dicamba, 2,3,6-TBA and tricamba; pyrimidinyloxybenzoic acid herbicides such as bispyribac and pyriminobac; pyrimidinylthiobenzoic acid herbicides such as pyrithiobac; phthalic acid herbicides such as chlorthal; picolinic acid herbicides such as aminopyralid, clopyralid and picloram; quinolinecarboxylic acid herbicides such as quinclorac and quinmerac; arsenical herbicides such as cacodylic acid, CMA, DSMA, hexaflurate, MAA, MAMA, MSMA, potassium arsenite and sodium arsenite; benzoylcyclohexanedione herbicides such as mesotrione, sulcotrione, tefuryltrione and tembotrione; benzofuranyl alkylsulfonate herbicides such as benfuresate and ethofumesate; carbamate herbicides such as asulam, carboxazole chlorprocarb, dichlormate, fenasulam, karbutilate and terbucarb; carbanilate herbicides such as barban, BCPC, carbasulam, carbetamide, CEPC, chlorbufam, chlorpropham, CPPC, desmedipham, phenisopham, phenmedipham, phenmedipham-ethyl, propham and swep; cyclohexene oxime herbicides such as alloxydim, butroxydim, clethodim, cloproxydim, cycloxydim, profoxydim, sethoxydim, tepraloxydim and tralkoxydim; cyclopropylisoxazole herbicides such as isoxachlortole and isoxaflutole; dicarboximide herbicides such as benzfendizone, cinidon-ethyl, flumezin, flumiclorac, flumioxazin and flumipropyn; dinitroaniline herbicides such as benfluralin, butralin, dinitramine, ethalfluralin, fluchloralin, isopropalin, methalpropalin, nitralin, oryzalin, pendimethalin, prodiamine, profluralin and trifluralin; dinitrophenol herbicides such as dinofenate, dinoprop, dinosam, dinoseb, dinoterb, DNOC, etinofen and medinoterb; diphenyl ether herbicides such as ethoxyfen; nitrophenyl ether herbicides such as acifluorfen, aclonifen, bifenox, chlomethoxyfen, chlormitrofen, etnipromid, fluorodifen, fluoroglycofen, fluoronitrofen, fomesafen, furyloxyfen, halosafen, lactofen, nitrofen, nitrofluorfen and oxyfluorfen; dithiocarbamate herbicides such as dazomet and metam; halogenated aliphatic herbicides such as alorac, chloropon, dalapon, flupropanate, hexachloroacetone, iodomethane, methyl bromide, monochloroacetic acid, SMA and TCA; imidazolinone herbicides such as imazamethabenz, imazamox, imazapic, imazapyr, imazaquin and imazethapyr; inorganic herbicides such as ammonium sulfamate, borax, calcium chlorate, copper sulfate, ferrous sulfate, potassium azide, potassium cyanate, sodium azide, sodium chlorate and sulfuric acid; nitrile herbicides such as bromobonil, bromoxynil, chloroxynil, dichlobenil, iodobonil, ioxynil and pyraclonil; organophosphorus herbicides such as amiprofos-methyl, anilofos, bensulide, bilanafos, butamifos, 2,4-DEP, DMPA, EBEP, fosamine, glufosinate, glyphosate and piperophos; phenoxy herbicides such as bromofenoxim, clomeprop, 2,4-DEB, 2,4-DEP, difenopenten, disul, erbon, etnipromid, fenteracol and trifopsime; phenoxyacetic herbicides such as 4-CPA, 2,4-D, 3,4-DA, MCPA, MCPA-thioethyl and 2,4,5-T; phenoxybutyric herbicides such as 4-CPB, 2,4-DB, 3,4-DB, MCPB and 2,4,5-TB; phenoxypropionic herbicides such as cloprop, 4-CPP, dichlorprop, dichlorprop-P, 3,4-DP, fenoprop, mecopropand mecoprop-P; aryloxyphenoxypropionic herbicides such as chlorazifop, clodinafop, clofop, cyhalofop, diclofop, fenoxaprop, fenoxaprop-P, fenthiaprop, fluazifop, fluazifop-P, haloxyfop, haloxyfop-P, isoxapyrifop, metamifop, propaquizafop, quizalofop, quizalofop-P and trifop; phenylenediamine herbicides such as dinitramine and prodiamine; pyrazolyl herbicides such as benzofenap, pyrazolynate, pyrasulfotole, pyrazoxyfen, pyroxasulfone and topramezone; pyrazolylphenyl herbicides such as fluazolate and pyrafiufen; pyridazine herbicides such as credazine, pyridafol and pyridate; pyridazinone herbicides such as brompyrazon, chloridazon, dimidazon, flufenpyr, metflurazon, norflurazon, oxapyrazon and pydanon; pyridine herbicides such as aminopyralid, cliodinate, clopyralid, dithiopyr, fluoroxypyr, haloxydine, picloram, picolinafen, pyriclor, thiazopyr and triclopyr; pyrimidinediamine herbicides such as iprymidam and tioclorim; quaternary ammonium herbicides such as cyperquat, diethamquat, difenzoquat, diquat, morfamquat and paraquat; thiocarbamate herbicides such as butylate, cycloate, di-allate, EPTC, esprocarb, ethiolate, isopolinate, methiobencarb, molinate, orbencarb, pebulate, prosulfocarb, pyributicarb, sulfallate, thiobencarb, tiocarbazil, tri-allate and vernolate; thiocarbonate herbicides such as dimexano, EXD and proxan; thiourea herbicides such as methiuron; triazine herbicides such as dipropetryn, triaziflam and trihydroxytriazine; chlorotriazine herbicides such as atrazine, chlorazine, cyanazine, cyprazine, eglinazine, ipazine, mesoprazine, procyazine, proglinazine, propazine, sebuthylazine, simazine, terbuthylazine and trietazine; methoxytriazine herbicides such as atraton, methometon, prometon, secbumeton, simeton and terbumeton; methylthiotriazine herbicides such as ametryn, aziprotryne, cyanatryn, desmetryn, dimethametryn, methoprotryne, prometryn, simetryn and terbutryn; triazinone herbicides such as ametridione, amibuzin, hexazinone, isomethiozin, metamitron and metribuzin; triazole herbicides such as amitrole, cafenstrole, epronaz and flupoxam; triazolone herbicides such as amicarbazone, bencarbazone, carfentrazone, flucarbazone, propoxycarbazone, sulfentrazone and thiencarbazone-methyl; triazolopyrimidine herbicides such as cloransulam, diclosulam, florasulam, flumetsulam, metosulam, penoxsulam and pyroxsulam; uracil herbicides such as butafenacil, bromacil, flupropacil, isocil, lenacil and terbacil; 3-phenyluracils; urea herbicides such as benzthiazuron, cumyluron, cycluron, dichloralurea, diflufenzopyr, isonoruron, isouron, methabenzthiazuron, monisouron, noruron and saflufenacil; phenylurea herbicides such as anisuron, buturon, chlorbromuron, chloreturon, chlorotoluron, chloroxuron, daimuron, difenoxuron, dimefuron, diuron, fenuron, fluometuron, fluothiuron, isoproturon, linuron, methiuron, methyldymron, metobenzuron, metobromuron, metoxuron, monolinuron, monuron, neburon, parafluoron, phenobenzuron, siduron, tetrafluoron and thidiazuron; pyrimidinylsulfonylurea herbicides such as amidosulfuron, azimsulfuron, bensulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, nicosulfuron, orthosulfamuron, oxasulfuron, primisulfuron, pyrazosulfuron, rimsulfuron, sulfometuron, sulfosulfuron and trifloxysulfuron; triazinylsulfonylurea herbicides such as chlorsulfuron, cinosulfuron, ethametsulfuron, iodosulfuron, metsulfuron, prosulfuron, thifensulfuron, triasulfuron, tribenuron, triflusulfuron and tritosulfuron; thiadiazolylurea herbicides such as buthiuron, ethidimuron, tebuthiuron, thiazafluoron and thidiazuron; and unclassified herbicides such as acrolein, allyl alcohol, aminocyclopyrachlor, azafenidin, benazolin, bentazone, benzobicyclon, buthidazole, calcium cyanamide, cambendichlor, chlorfenac, chlorfenprop, chlorflurazole, chlorflurenol, cinmethylin, clomazone, CPMF, cresol, ortho-dichlorobenzene, dimepiperate, endothal, fluoromidine, fluridone, fluorochloridone, flurtamone, fluthiacet, indanofan, indaziflam, methazole, methyl isothiocyanate, nipyraclofen, OCH, oxadiargyl, oxadiazon, oxaziclomefone, pentachlorophenol, pentoxazone, phenylmercury acetate, pinoxaden, prosulfalin, pyribenzoxim, pyriftalid, quinoclamine, rhodethanil, sulglycapin, thidiazimin, tridiphane, trimeturon, tripropindan and tritac. The seed or soil treatment compositions can also be used in conjunction with glyphosate, glufosinate or 2,4-D on glyphosate-tolerant, glufosinate-tolerant or 2,4-D-tolerant crops.

Plant Growth Regulators.

Any suitable plant growth regulator can be used to carry out the present invention, including but not limited to azoles (such as uniconazole, and paclobutrazol), cyclohexane carboxylates (such as trinexapac-ethyl, and prohexadione-calcium), pyrimidinyl carbinols (such as flurprimidol, and ancymidol), quarternary ammoniums (such as chlormequat-chloride, and mepiquat-chloride), and sulphonyl-amino phenyl-acetamides (such as mefluidide), etc. See, e.g., Haas and Harp, PCT Patent Application WO 2011063947.

C. Nanoparticles.

A variety of hollow nanoparticles that can be used to carry an agricultural active agent as described herein are known. Examples include, but are not limited to, those set forth in US Patent Application Nos. 20090011036 and 20060292118. In some embodiments, the hollow nanoparticles have an encapsulating coat or shell comprising, consisting of, or consisting essentially of a biodegradable polymer such as a protein, peptide, polysaccharide, or combination thereof. In some embodiments, the nanoparticles have a mean average diameter of from about 10 or 20 nm up to 100 or 500 nm. In some embodiments, the hollow nanoparticles are viral nanoparticles, particularly plant viral nanoparticles or "PVNs".

Viral Nanoparticles.

A wide variety of virus nanoparticles can be used to carry out the present invention. For example, the composition can comprise a plurality of viruses of a single family, genus, species or strain; or a plurality of different families, genus, species or strains of viruses. In an embodiment, the plant virus is a member of a family of plant viruses classified as Tombusviridae. In one embodiment, the plant virus belongs to the genus Dianthovirus. Other plant viruses include certain viruses belonging to the family Comoviridae or Bromoviridae (e.g., Cucumber mosaic virus). For example, the virus can be a Comovirus. In other embodiments, the plant virus is a Sobemovirus. As will be readily appreciated by those skilled in the art, the virus serves as a platform carrier for the active. Thus, as noted, a wide variety of viruses, or combinations thereof, mat be useful in the present invention.

In exemplary alternate embodiments, the nanoparticle is a virus-like particle comprising viral coat protein and viral genome. In other embodiments, the nanoparticle is a virus-like nanoparticle comprising viral coat protein but lacking a viral genome.

In an exemplary embodiment, the exemplary plant virus nanoparticles are plant virus capsids or capsid-like structures, namely, red clover necrotic mosais virus (RCNMV). RCNMV is a single stranded RNA plant virus of the Tombusviridae family and the dianthovirus genus. Other types of plant viruses, however, may be suitable for use in a nanofiber fabric as cargo carrying capsids including, artichoke mottled crinkle virus, Carnation Italian ringspot virus, cucumber necrosis virus, cymbidium ringspot virus, Eggplant mottled crinkle virus, Grapevine Algerian latent virus, Lato River virus, Moroccan pepper virus, Neckar River virus, pelargonium leaf curl virus, petunia asteroid mosaic virus, sitke waterborne virus, and the tomato bushy stunt virus.

RCNMV is a robust plant virus that is viable in several environments while being substantially inert to human, or other mammalian tissue. The RCNMV exists within, and outside of, plant and animal cells and has been found in soil, fresh and saltwater environs. RCNMV is combinable with biodegradable and biocompatible polymers as described herein and the structural integrity of RCNMV is maintained throughout electrospinning the nanofiber nonwoven fabric.

RCNMV has a viral structure suitable for receiving and carrying actives within its protein walls. The RCNMV has 180 copies of a capsid protein arranged to form a T=3 icosahedral virion. Each capsid protein packages either 1 copy of a single stranded RNC-1 and RNA-2 or 4 copies of RNA-2. The RCNMV has an outer diameter of about 36.6 nm and an inner cavity with a diameter of about 17 nm. The inner cavity of a RCNMV is capable of receiving any molecule or species with a diameter less than about 20 angstrom. In alternate embodiments, however, other viral structures can be used, such as those with a less dense or hollow core. For example, the virus can be a member of another family of ichosahedral viruses including but not limited to Bromoviridae, Comoviridae, or Tombusviridae. More or less capsid protein copies can form the outershell, depending upon the particular plant virus selected.

In an exemplary embodiment, the PVNs may be selectively opened and closed as needed to either load actives into the capsid shell, or to release actives from the capsid shell. The RCNMV is one such exemplary virus. The RCNMV has divalent ions arranged within and around the 180 capsid protein units. Selective removal of the divalent ions reorients the capsid protein shell and protruding domains and opens a pathway for the infusion of actives into the inner cavity of the virus. The divalent ions include about 360+/− $Ca^{2+}$ ions and about 420+/−$Mg^{2+}$ ions and the selective removal of these ions open and close RCNMV as needed. Thus, the introduction of RCNMV, or other loaded PVN, into calcium or magnesium rich mediums may facilitate opening and closing of the capsid protein shell. In addition to divalent ion removal, modifying the pH of the medium surrounding the RCNMV facilitates the opening and closing of the plant virus capsid. For example, a pH of about 5.0 may open the RCNMV virus and a pH of about 8.0 may close the RCNMV virus.

The loading of the actives within the PVN is repeatable and scalable. Initially, the plant virus nanoparticle is purified in a water and buffer solution. A chelating agent, such as (ethylenediaminetetraacetic acid) EDTA is added to the purified virus to remove the divalent ions causing rotation of the capsid protein copies. The rotation of the capsid proteins opens channels to the inner cavity of the plant virus nanoparticle, as described above. A selected active is then loaded into the plant virus capsid and the active-plant virus solution rests for about one hour. Following the loading step, Calcium ($Ca^{2+}$) and/or Magnesium ($Mg^{2+}$) are added back to the plant virus capsid rotating the capsid protein copies to close the channels, thus encapsulating the active within the inner cavity of the PVN. In some embodiments, the load PVN is then suspended in a water-buffer solution for a period of time. In other alternate embodiments, in vitro assemblage may be used to incorporate an active within a plant virus nanoparticle. The loaded PVN, e.g. the loaded RCNMV, may be combined with carriers as described below.

D. Carriers and Carrier Matrices.

Compositions of the present invention can be provided as suitable formulations, such as solutions, emulsions, wettable powders, suspensions, powders, dusts, pastes, soluble powders, granules, suspoemulsion concentrates, natural and synthetic materials impregnated with active compound, and ultrafine encapsulations in polymeric materials. These formulations are produced in the known manner, for example by mixing the active compound with extenders, that is, liquid solvents and/or solid carriers, optionally with the use of surfactants, that is, emulsifiers and/or dispersants and/or foam formers. Suitable extenders are, for example, water, polar and unpolar organic chemical liquids, for example from the classes of the aromatic and nonaromatic hydrocarbons (such as paraffins, alkylbenzenes, alkylnaphthalenes, chlorobenzenes), of the alcohols and polyols (which can optionally also be substituted, etherified and/or esterified), of the ketones (such as acetone, cyclohexanone), esters (including fats and oils) and (poly)ethers, of the unsubstituted and substituted amines, amides, lactams (such as N-alkylpyrrolidones) and lactones, the sulphones and sulphoxides (such as dimethyl sulphoxide).

In the case of the use of water as an extender, organic solvents can, for example, also be used as cosolvents. Liquid solvents which are suitable are mainly: aromatics, such as xylene, toluene or alkylnaphthalenes, chlorinated aromatics or chlorinated aliphatic hydrocarbons, such as chlorobenzenes, chloroethylenes or methylene chloride, aliphatic hydrocarbons, such as cyclohexane or paraffins, for example mineral oil fractions, mineral oils and vegetable oils, alcohols, such as butanol or glycol as well as their ethers and esters, ketones, such as acetone, methyl ethyl ketone, methyl isobutyl ketone or cyclohexanone, strongly polar solvents, such as dimethylformamide and dimethyl sulphoxide, and water.

Solid carriers which are suitable are for example, ammonium salts and ground natural minerals, such as kaolins, clays, talc, chalk, quartz, attapulgite, montmorillonite or diatomaceous earth, and ground synthetic minerals, such as highly-disperse silica, alumina and silicates; suitable solid carriers for granules are: for example crushed and fractionated natural rocks such as calcite, marble, pumice, sepiolite and dolomite, and synthetic granules of inorganic and organic meals, and granules of organic material such as sawdust, coconut shells, maize cobs and tobacco stalks; suitable emulsifiers and/or foam formers are: for example non-ionic and anionic emulsifiers, such as polyoxyethylene fatty acid esters, polyoxyethylene fatty alcohol ethers, for example alkylaryl polyglycol ethers, alkylsulphonates, alkyl sulphates, arylsulphonates as well as protein hydrolysates; suitable dispersants are: for example lignin-sulphite waste liquors and methylcellulose.

Adhesives such as carboxymethylcellulose and natural and synthetic polymers in the form of powders, granules or latices, such as gum arabic, polyvinyl alcohol and polyvinyl acetate, and natural phospholipids, such as cephalins and lecithins, and synthetic phospholipids, can be used in the formulations. Other additives can be mineral and vegetable oils. Colorants may be added such as inorganic pigments, for example iron oxide, titanium oxide and Prussian Blue, and organic dyestuffs, such as alizarin dyestuffs, azo dyestuffs and metal phthalocyanine dyestuffs, and trace nutrients such as salts of iron, manganese, boron, copper, cobalt, molybdenum and zinc.

In some embodiments, the carrier comprises organic or inorganic, natural or synthetic, fibers. Such a carrier may comprise inert (stable) or biodegradable fibers. The fibers may be any suitable shape, including multilobe fibers, and may be of any suitable diameter (e.g., from 10 nm to 500 microns in diameter). Suitable polymers include proteins, polysaccharides such as cellulose, and those polymers discussed below. The fibers may be woven or nonwoven. Nanoparticles may be bound to the carrier by any suitable technique, including covalent coupling.

Biodegradable Nonwoven Polymer Fabric Carriers.

In some embodiments the carrier comprises a nonwoven fabric of a biodegradable polymer as described in B. Pourdeyhimi et al, US Patent Application No. 20120015020 (Jan. 19, 2012). Nonwoven polymer fabrics may be in any suitable form and produced by any suitable technique, including but not limited to stitch bonding, needle punching, hydroentangling, etc., including combinations thereof. In some embodiments, electrospinning is used to form the biodegradable and biocompatible polymers and loaded PVNs into a nanofiber nonwoven fabric. A composition comprising a biodegradable polymer-solvent blend and PVN solution is electrospun to form the nanofiber nonwoven fabric comprising the PVN loaded. Electrospinning forms fibers directly from a polymer solution with minimal or very low thermal input during processing. Plant virus capsids that may be heat sensitive, e.g., such as the red clover necrotic mosaic virus (RCNMV), maintain their structural integrity throughout the electrospinning process. In another embodiment, the nanofiber fabric is formed by an electrospinning process such as Nanospider™. The Nanospider™ machine is similar to the electrospinning apparatus described above, however, the polymer solution is poured into a tray in which a rotating electrode is sitting. Rotation of the charged electrode induces charge in the solution and forms nanofibers when the charge overcomes the surface tension of the solution. In other alternate embodiments, other solution spinning methods may be used to form a nanofabric.

In some embodiments, electro spinning forms the nanofiber fabric directly from a polymer solution. The polymer solution includes a polymer-solvent blend and a loaded PVN solution. The loaded PVN solution includes the plant virus nanoparticles with the active, and other additives, e.g. a buffer. In an exemplary embodiment, the ratio of the PVN solution to the polymer-solvent blend is about 2:1. In another embodiment, the ratio of PVN solution to the polymers solvent blend is about 2:1. In other embodiments, the ratio may range from about 1:1 to 10:1 of a PVN to polymer-solvent blend. In still other embodiments, the ratio may range from about 1:1 to about 1:10 of PVN to polymer-solvent blend.

In some embodiments, the polymer-solvent blend includes one or more polymers in a polymer blend and a solvent. In an exemplary embodiment, the polymer-solvent blend may comprise between about 5 to about 20% by weight of one or more polymers, and between about 80 to 95% by weight of a solvent. In an exemplary embodiment, the polymer concentration is about 12% and solvent concentration is about 88%).

Biodegradable and biocompatible polymers that can be used to form the nanofiber fabric include, but are not limited to, polyglycolic acid, polylactic acid, polyethylene oxide, polycaprolactone (PCL), polyethylenimine-polyethylene glycol, cyclodextrin, and ethylene vinyl acetate poly(L-lysine)-poly(ethylene glycol) (PLL-PEG), polyethylenimine (PEI), poly(a-[4-aminobutyl]-1-glycolic acid) (PAGA), cyclodextrin (CD), Poly(2-(dimethylamino)ethyl methacrylate) (pDMAEMA), polyvinyl alcohol) (PVA), poly(enol-ketone) (PEK) and N-(2-hydroxypropyl)methacrylamide (HPMA) copolymers, copolymers of each, and any combination thereof. The polymers listed above may be used alone or combined with one or more of the others. For example, in an embodiment, a first polymer and second polymer may be combined in a polymer blend in any particular weight percent. For example the first polymer may comprise between about 1% to about 99% of the total polymers in the polymer-solvent blend, while a second polymer comprises the balance of the total polymer in the polymer-solvent blend. For example, the second polymer may comprise between about 1% to about 99% of the total polymer in the polymer solution blend. In other embodiments, a first, second and third polymer may be used in the polymer blend. In such an embodiment, the third polymer may comprise between about 1% to about 99% of the total polymer in the polymer-solvent blend.

In some embodiments, polyethylene oxide (PEO) is of particular interest as a polymer that is blended with the one or more polymers listed above. PEO is biodegradable and biocompatible, it is hydrophilic and it produces homogenous blend solutions with PLA resulting in a more uniform hybrid electrospun fibers. PEO is typically more hydrophilic and will biodegrade at a faster rate than the other polymers described above. When combined in amounts up to about 50% with one of the other polymers, it will vary fiber surface morphology (e.g., the size and number of surface pores on the fiber), the degradation rate of the matrix structure, and may also affects the release rate of the active. For example, the fiber surface pore distribution may vary with the amount of PEO in the polymer blend. In an embodiment, the more the PEO in the blend, fewer pores are formed on the fiber surface and there is less uniformity in pore sizes. With increased amounts of PEO in the polymer blend, the degradation rate may also increase. In addition, the integrity of the fiber structure and fiber diameter distribution may change as well. In an embodiment, blends of polymers may be used to form the nanofiber nonwoven fabric. For example, a blend of polylactic acid and polyethylene oxide may be used. The polylactic acid (PLA) may be blended with polyethylene oxide (PEO) at levels of 90% PLA/10% PEO, 80% PLA/20% PEO, 70% PLA/30% PEO, and 50% PLA/50% PEO. Other blends with more PEO are also possible, but preferably the PEO content in these other blends would not exceed about 50%.

Preferably, solvents used in electrospinning are compatible with the plant virus nanoparticles. In an embodiment, the solvents are compatible with RCNMV. Polar solvents, however, are typically suitable for electrospinning due to the dielectric effect and its impact on charge and fiber formation. Exemplary solvents include dicholoromethan (DMC), ethylene acetate (EA), dichloroethylene (DCE), dimethylformamide (DMF), hexafluoroisopropanol (HIFP), dichloromethane (DCM), tetrahydrofuran (THF), ethyl acetate (EA), chloroform, acetone, heptane, isopropylalcohol, octanol and toluene, and water.

While electrospun nonwoven fiber carriers are discussed above, the polymers described above may be formed into other forms of woven and nonwoven fabrics, including but not limited to needle punched, stitch bonded, and hydroentangled fabrics, by known techniques, for use in carrying out the present invention.

Fiber or fabric carriers as described herein can advantageously be "tuned" by adjustment of a variety of parameters therein to enhance the activity of the composition for a particular purposes. Thus, for example, the fibers can be any suitable diameter, such as from 10 nanometers in diameter, up to 100 or 500 microns in diameter.

The fibers can be any suitable length, such as from 1 millimeter in length up to continuous filaments (e.g., several meters in length).

In some embodiments, the fibers have a water contact angle between 0 and 140 degrees.

In some embodiments, the fibers have a dry strength of from 1 kNm/kg to 150 kNm/kg In some embodiments the fibers are perforated or porous (e.g., with 1 to 100 micrometer sized pores or holes), e.g., to reduce the dry strength thereof.

In some embodiments, the fibers are extensible or elongatable (e.g., can extend up to two, three, four or five times their length, or more, to accommodate growth of the plant contained in the carrier or to which the carrier is applied—such as the growth of roots and/or shoots from a seed or other plant part, typically a propagatable plant part, to which the carrier is applied).

In some embodiments, the basis weight of the carrier is between 10 grams/m$^2$ to 120 grams/m$^2$.

In some embodiments, the percent moisture retention of the carrier is from 1 or 10 percent, up to 700%.

In some embodiments, the composition is provided as a pre-formed sheet (which may be sized for the intended plant or plant part, or cut, torn, or separated to size for the intended plant part) that is then wrapped (partially or fully) around the plant or plant part; in other embodiments, the composition is sprayed or coated directly on the plant or plant part.

In some embodiments, when the plant or plant part is a seed, the volume of the composition is sufficiently large to be distributed throughout the propagating plant root.

E. Plants.

Any plant genus or species can be used with the methods and compositions of the present invention, including, but not limited to, monocots and dicots. See, e.g., U.S. Pat. No. 8,080,647 (Pioneer Hi Bred). Examples of plant genuses and species include, but are not limited to, corn (*Zea mays*), *Brassica* spp. (e.g., *B. napus, B. rapa, B. juncea*), castor, palm, alfalfa (*Medicago sativa*), rice (*Oryza sativa*), rye (*Secale cereale*), sorghum (*Sorghum bicolor, Sorghum vulgare*), millet (e.g., pearl millet (*Pennisetum glaucum*), proso millet (*Panicum miliaceum*), foxtail millet (*Setaria italica*), finger millet (*Eleusine coracana*)), sunflower (*Helianthus annuus*), safflower (*Carthamus tinctorius*), wheat (*Triticum aestivum*), soybean (*Glycine max*), tobacco (*Nicotiana tabacum*), potato (*Solanum tuberosum*), peanuts (*Arachis hypogaea*), cotton (*Gossypium barbadense, Gossypium hirsutum*), sweet potato (*Ipomoea batatus*), cassaya (*Manihot esculenta*), coffee (*Coffea* spp.), coconut (*Cocos nucifera*), pineapple (*Ananas comosus*), citrus trees (*Citrus* spp. such as lemon, lime, orange, tangelo, tangerine, etc.), cocoa (*Theobroma cacao*), tea (*Camellia sinensis*), banana (*Musa* spp.), avocado (*Persea americana*), fig (*Ficus casica*), guava (*Psidium guajava*), mango (*Mangifera indica*), olive (*Olea europaea*), papaya (*Carica papaya*), cashew (*Anacardium occidentale*), macadamia (*Macadamia integrifolia*), almond (*Prunus amygdalus*), sugar beets (*Beta vulgaris*), sugarcane (*Saccharum* spp.), *Arabidopsis thaliana*, oats (*Avena* spp.), barley (*Hordeum* spp.), leguminous plants such as guar beans, locust bean, fenugreek, garden beans, cowpea, mungbean, fava bean, lentils, and chickpea, vegetables, ornamentals, grasses and conifers. Vegetables include tomatoes (*Lycopersicon esculentum*), lettuce (e.g., *Lactuca sativa*), green beans (*Phaseolus vulgaris*), lima beans (*Phaseolus limensis*), peas (*Pisium* spp., *Lathyrus* spp.), and Cucumis species such as cucumber (*C. sativus*), cantaloupe (*C. cantalupensis*), and musk melon (*C. melo*). Ornamentals include azalea (*Rhododendron* spp.), hydrangea (*Macrophylla hydrangea*), hibiscus (*Hibiscus rosa-sanensis*), roses (*Rosa* spp.), tulips (*Tulipa* spp.), daffodils (*Narcissus* spp.), petunias (*Petunia hybrida*), carnation (*Dianthus caryophyllus*), poinsettia (*Euphorbia pulcherrima*), and chrysanthemum. Conifers include pines, for example, loblolly pine (*Pinus taeda*), slash pine (*Pinus elliotii*), ponderosa pine (*Pinus ponderosa*), lodgepole pine (*Pinus contorta*), and Monterey pine (*Pinus radiata*), Douglas fir (*Pseudotsuga menziesii*); Western hemlock (*Tsuga canadensis*), Sitka spruce (*Picea glauca*), redwood (*Sequoia sempervirens*), true firs such as silver fir (*Abies amabilis*) and balsam fir (*Abies balsamea*), and cedars such as Western red cedar (*Thuja plicata*) and Alaska yellow cedar (*Chamaecyparis nootkatensis*).

F. Methods of Treating.

The compositions of the present invention may be applied to plants (including parts thereof) directly or indirectly by any suitable technique, including but not limited to spraying, atomizing, dusting, scattering, coating or pouring, depending upon the particular plant or crop being treated.

Seed and Soil Treatment.

In some embodiments, seed is coated with the compositions of the invention, and/or soil is treated with compositions of the invention. The seeds may be substantially uniformly coated with one or more layers of the composition comprising the nanoparticle and optionally the carrier fibers, concurrently or sequentially and one or more optional compounds using conventional methods of mixing, spraying or a combination thereof. Application is generally done using specifically designed and manufactured equipment that accurately, safely, and efficiently applies seed treatment products to seeds. Such equipment uses various types of coating technology such as rotary coaters, drum coaters, fluidized bed techniques, spouted beds, rotary mists or a combination thereof. In one embodiment, application is done via either a spinning "atomizer" disk or a spray nozzle which evenly distributes the seed treatment onto the seed as it moves through the spray pattern. The seed may then be mixed or tumbled for an additional period of time to achieve additional treatment distribution and drying. The seeds can be primed or unprimed before coating with the inventive compositions to increase the uniformity of germination and emergence. In an alternative embodiment, a dry powder composition can be metered onto the moving seed.

The seeds may be coated via a continuous or batch coating process. In a continuous coating process, continuous flow equipment simultaneously meters both the seed flow and the seed treatment products. A slide gate, cone and orifice, seed wheel, or weight device (belt or diverter) regulates seed flow. Once the seed flow rate through treating equipment is determined, the flow rate of the seed treatment is calibrated to the seed flow rate in order to deliver the desired dose to the seed as it flows through the seed treating equipment. Additionally, a computer system may monitor the seed input to the coating machine, thereby maintaining a constant flow of the appropriate amount of seed. In a batch coating process, batch treating equipment weighs out a prescribed amount of seed and places the seed into a closed treating chamber or bowl where the corresponding of seed treatment is then applied. The seed and seed treatment are then mixed to achieve a substantially uniform coating on each seed. This batch is then dumped out of the treating chamber in preparation for the treatment of the next batch. With computer control systems, this batch process is automated enabling it to continuously repeat the batch treating process. In either coating process, the seed coating machinery can optionally be operated by a programmable logic controller that allows various equipment to be started and stopped without employee intervention.

In one embodiment, the seed or soil treatment composition along with one or more optional components are formulated as a soil treatment. The soil treatment may be in addition to, or as a substitute for, the seed treatment. Soil may be treated by application of the desired composition to the soil by conventional methods such as spraying. Alternatively, the desired composition can be introduced to the soil before germination of the seed or directly to the soil in contact with the roots by utilizing a variety of techniques included, but not limited to, drip irrigation, sprinklers, soil injection or soil drenching. The desired composition may be applied to the soil before planting, at the time of planting, or after planting.

The present invention is explained in greater detail in the following non-limiting Examples.

EXAMPLES

FIG. 1 illustrates the incorporation of PVNs based on work described in B. Pourdeyhimi et al., US Patent Application No. 20120015020 (Jan. 19, 2012). FIG. 1*a* shows PVNs physisorbed onto polymeric (PLA) fibers; FIG. 1*b* shows PVNs premixed with polymer prior to fiber spinning; and FIG. 1*c* physisorbed onto porous PLA fibers. In the case of (c), the physisorption allowed the particles to embed in the fiber pores resulting in more robust incorporation of the PVN in the fiber matrix.

FIG. 1*d* illustrates covalently linking PVN particles to a polymeric backbone. For this work, the polymeric backbone is in bulk form or in fiber form. The reaction scheme is identical although the yield will depend on adequate mixing and kinetics (viscosity of a polymer melt versus surface modification to fibers). Essentially we follow a glutaradehyde coupling with PVN-peptide and fiber-$NH_2$ activated surfaces. 0.

A prototype integrates a nematocide to determine performance in a critical application of an unmet commercial need for agriculture. This choice is made based on the access to existing protocols that can test the efficacy of the designs in an animal model and crop system.

Active ingredients, currently in commercial use, that can be formulated into a nanofiber format include, but are not limited to: Avermectin (alone or in combinations of several avermectins such as in abemectin; commercially available as Agri-Mek/Ivermectin from Syngenta Crop Protection); Oxamyl (carbamate) (commercially available as Vydate from DuPont), Ethoprop (commercially available as Mocap from Bayer), Carbofuran (carbamate) commercially available as Furadan from FMC), and Fenamiphos (organophosphate) (commercially available as Nemacur from Bayer).

Toxicity against nematodes and in plants is tested as described below.

Nematode Toxicity Assay.

Bioassays will be conducted in liquid cultures. *Escherichia coli* strain NA22 will be transferred to EC (Difco) broth and allowed to incubate for 24 hours at room temperature. Ten milliliters of this medium will be added to 100 ml of M9 buffer containing 5 mg ampicillin (a bacteriostat) and 10,000 units nystatin (a fungicide) and stirred at room temperature for 2 hours (test medium). Compounds of ivermectin, vyadate, and nemacur will be prepared for testing. Nematodes will be rinsed from NGM plates and concentrated to 1 nematode/ul. One hundred nematodes will be added to each well of a 24-well culture plate and 800 ul test medium added. Finally, 100 ul test compound will be added and the entire contents of each well mixed thoroughly. Untreated wells will contain sterile distilled water as a replacement for anti-nematode content. Ivermectin unbound to fibers will be used as a control, as will the cholinergic receptor-binding agonist levamisole. Nematodes will be examined through a dissecting microscope and reproduction determined by nematode density. It will also be easy to determine nematode paralysis by visualization. Nematodes will be examined at 1 hour, 24 hours, and daily thereafter for 7 days.

Plant Functional Assay.

Functional assays, comprised of two sub-assays (lawn and liquid) will be used to test the performance of PVNs (i.e. surface channel formation) and test nematicides in soybean cyst nematode infested soil. In the lawn assay, high concentrations of test nematicides (ivermectin, vydate, and nemacur) will be spotted on Agar plate of c. elagans. In the liquid assay, RCNMV particles infused with the same test nematicides will be spotted individually on Agar plates of c. elagans. Literature claims that RCNMV particles will have open surface channels (pores) at pH~5 and close channels at pH~8 (10), thus both assays will be carried out at two pH levels (pH 5.3 and pH 7.4). Ultimately, it is intended to evaluate nematicide functionalities and PVNs' surface channel formation (thus releasing the loaded cargo) in controlled environmental (greenhouse) conditions for soybean cultivation.

Tailored Release of Active Ingredient by Combination of Cellulose Fibers and PVNs.

Figures 3A, 3B:
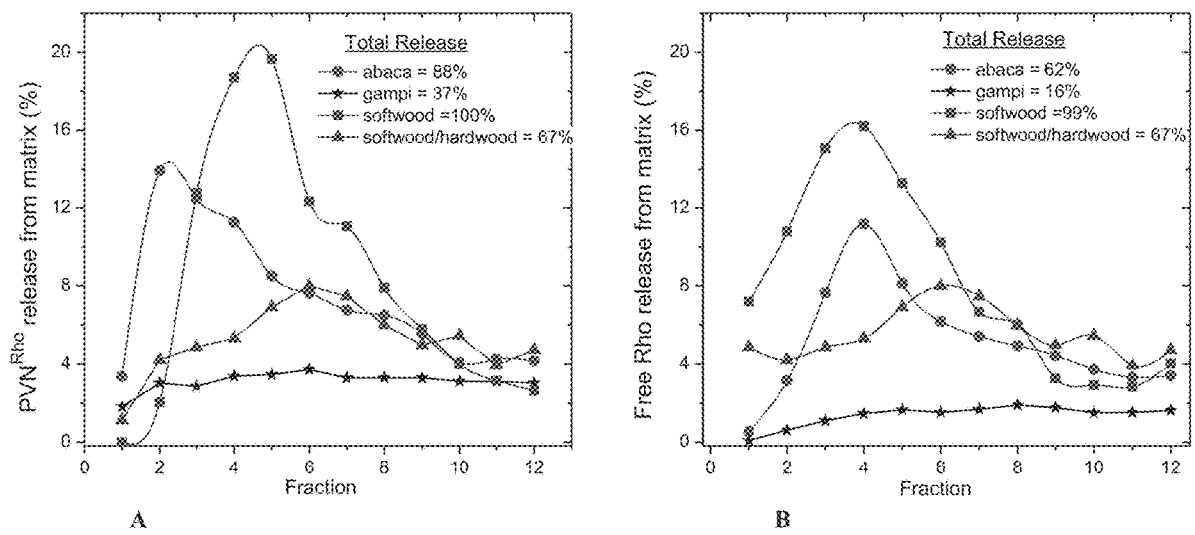
FIG. 3A-3B Release of a) $PVN^{Rho}$ and b) free Rho after physisorbed on different cellulosic matrices: gampi (-★-), abaca ◆ softwood ※ and 60/40 softwood/hardwood ▲. The number represents the percent of total release for each fibrous matrix. Methods: $PVN^{Rho}$—or free Rho-absorbed matrix is placed as a filter paper in a column; a total of 12 fractions of water was continuously flowed through the matrix and collected separately in a multiwell plate. The amount of released $PVN^{Rho}$ or free Rho is measured by absorbance at 530 nm.

Fibrous matrix can provide an additional mechanism for controlled release of active ingredients whether the active is in free form or encapsulated in PVN. The physical properties (or polymer dynamics) of the matrices and incorporation method of PVN into the matrices will dictate the release profile based on the mobility of the active in the matrix. FIGS. 3A-3B shows the release profiles of rhodamine-loaded PVNs (PVN$^{Rho}$) and free rhodamine after simple physisorption on different fiber matrices. Abaca, gampi and wood fiber are cellulose from different sources, with distinct differences in the cargo release rate. The gampi matrix can retain more cargo with the potential for sustainable long-term release. Softwood fibers, on the other hand, possess a burst release profile of active ingredient. According to the desired release profiles, these fibers can be combined for multi-modal release behavior for active delivery. Characterization of the chemical composition and morphology of the supporting matrices is necessary to precisely control the release kinetics. Beyond characterization of the matrices is identifying the interactions between the specific host matrix and the plant viral nanoparticles.

Figure 2A:
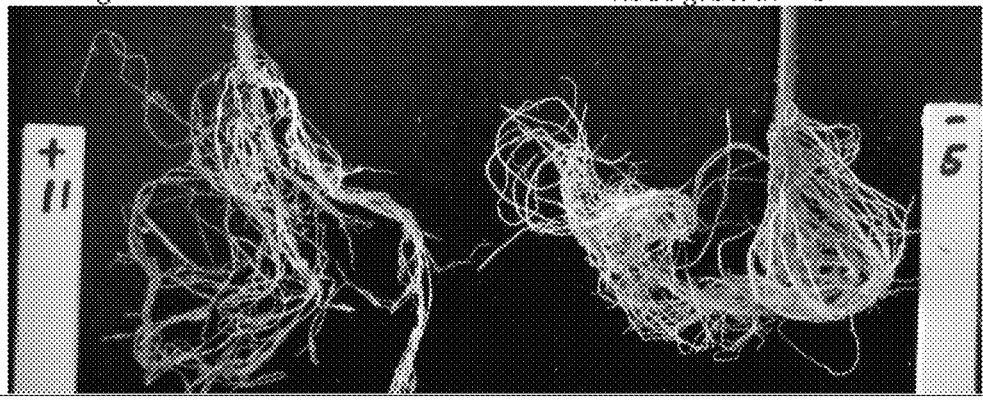
FIGS. 2A-2B, Testing $PVN^{ABM}$ formulation in RKN infested soil. (A) RKN positive control and normal soil conditions. (B) ABM-RKN(+) and $PVN^{ABM}$-RKN(+). Scoring: 4 is worst, 0 is best.
Figure 2B:
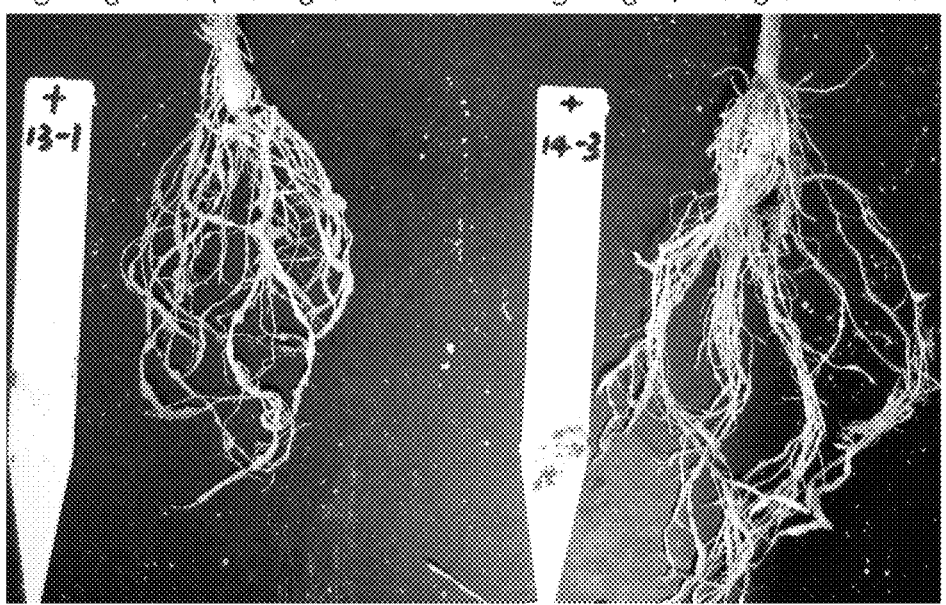
Figure 3C:
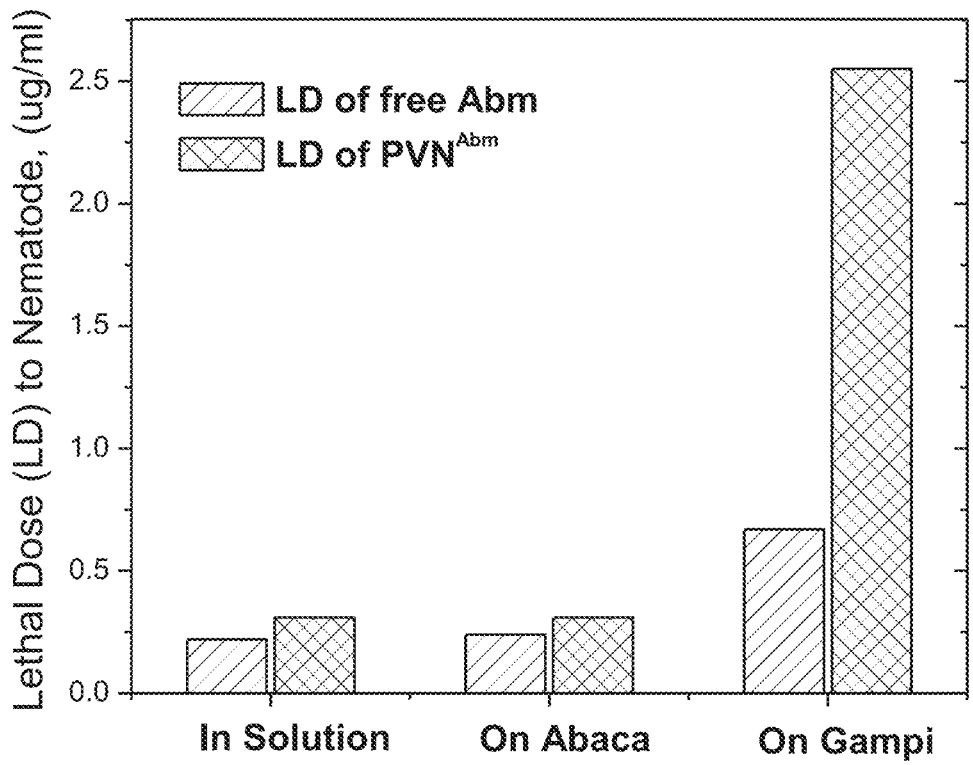
FIG. 3C Lethal dose of abamectin-loaded $PVN^{Abm}$ and Free Abm to *C. elegans* nematode when in solution and physisorbed on abaca or gampi matrices.
Figure 4:
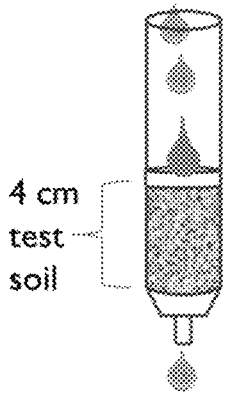
FIG. 4. Testing the mobility of a $PVN^{ACTIVE}$ through a soil bed.
Figure 4:
Figure 4:
Figure 4:
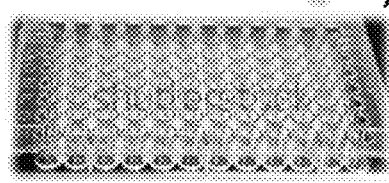

Preliminary data has given some indication that hybrid PVN fiber matrices can serve as a delivery system as tested in a specific application for nematode control in crop protection. The nematicide, abamectin (Abm/ABM), was successfully loaded into PVN (~80 molecules per virion). PVN$^{Abm}$ and free Abm at the same concentration were physisorbed on gampi and abaca matrices. These active-loaded fiber matrices were applied to test the prevention of Root knot nematode (RKN) Meloidogyne hapla in the model tomato/sand system. The results indicated that only the free Abm-loaded gampi matrix was effective reducing nematode damage as measured by the degree of root galling, see FIGS. 2A-2B. This positive result is attributed to the sustainable release properties of the gampi matrix (see FIG. 3A-3B). However, PVN$^{Abm}$ loaded gampi matrix did not appear effective against nematode control contradicting the release profile behavior. This contradicting result could be due to increased PVN$^{Abm}$ mobility in the sand as well as the release profile of Abm from PVN. PVN$^{Abm}$ loaded gampi matrix also exhibited much lower bioactive to kill C. elegans nematode in culture as shown in FIG. 3C. The major issue with abamectin, as an effective nematicide, is its poor soil mobility. This is due to its high tendency to bind with soil ions preventing abamectin distribution in nematode infested soil. Changing the soil interactions by encapsulation with the viral nanoparticle or complexation with its surface or fiber matrix appears to show some promise. To optimize the delivery system, there is a critical need to elucidate the interactions between the PVN and fiber matrix for optimal control of the active distribution and ultimately the zone of nematode protection around the crop's root mass.

Formulating PVN$^{Active\ Ingredient}$.

The following protocol has been developed for loading and characterization of cargos to PVN. Opening and closing buffers are known and described in L. Loo, R. Gunenther, S. Lommel and S. Franzen, Chem. Commun (Camb) 7(1): 88-90 (2008).

A 300 µl aliquot of purified RCNMV (10 mg/ml) is placed in a 1.5 ml tube and EDTA in loading buffer is added to a 20 mM final concentration, mixed and incubated for 15 minutes at 20-25° C. After incubation, 50 µl of active ingredient (AI) is added. AI is generally dissolved in ethanol but DMSO is sometimes used dependent on the AI. The sample is then incubated at 20-25° C. overnight. After incubation, the sample is conditioned for purification by the addition of 50 µl closing buffer and 50 µl CaCl$_2$ solution. Non-infused cargo is removed by passing the reaction mixture through a GE NAP (size exclusion) column. All formulations are characterized by determining the concentration of the PVN (spectrophotometrically) and the cargo load evaluated by OptiPrep™ density gradient centrifugation. For those formulations that demonstrate bioactivity in the nematode assay described below, a more rigorous quantification of load by HPLC methods is performed. This process is followed for all candidate compounds.

Incorporating Nematicides and PVNs in Cellulose Matrices Fabricate PVN-Functionalized Polymer Matrices.

Polyesters have sufficient functionality with the carbonyl oxygen atom to complex with exposed reactive lysine or cysteine residues from the capsid protein of the PVN. For thermoplastic polyesters, porous poly(lactic acid) (PLA) fibers from our previous studies as well as poly(caprolactone) (PCL) are used. Poly(caprolactone) has the advantages of being highly extensible (over 500% elongation before break) and biodegradable. It has also been shown that when chitosan, a natural polysaccharide, was grafted to PCL, the extensibility (or strain) of the polymer exceeded 1500% of its original length. The rate of biodegradation has been tuned by the addition of starch. Evaluating the elastomeric polyester fibers, such as poly(1,8-octanediol-co-citric acid) (POC), allows us to evaluate the effect that modulus and morphology have on the efficiency of the matrix as a seed coating. These polyol/dicarboxylic acid based bioelastomers [POC or poly(glycerol sebacate) (PGS)], being elastic, could have more resiliency than a more rigid, yet extensible, thermoplastic to design a seed coating with sufficient mechanical properties to extend with the growing root. Prior work has demonstrated that PGS can extend greater than 300% its original length before break as controlled by the degree of crosslinking, process temperature and molar ratio of the monomers, glycerol and sebacic acid. While POC has a lower reported elongation at break, it has an advantage of being formulated at room temperatures to allow for in situ PVN incorporation. Finally, the use of cellulosic materials allows for chemical conjugation of the PVN to its surface. This mode of PVN incorporation can enable prolonged stability and further manipulation of the cargo release mechanisms.

Matrix Fabrication.

Wood fiber matrices are pulped via traditional chemical and mechanical methodologies. Briefly, raw fibers are exposed to caustic pre-treatment to remove lignin and disrupt hydrogen bonding. Next, the pulped material is subjected to mechanical shear for fiber dispersion. Handsheets are formed via a traditional vacuum deckle and mold. PLA, PCL, POC and PGS nanofibers are prepared via previously reported electrospinning methods. Electro spinning is a simple processing procedure where the resultant fiber properties are controlled by solution surface tension, viscosity, applied voltage and distance from the syringe tip to collector plate (or attenuation distance). The electrospinning set-up comprises a variable high voltage supply (Gamma High Voltage Research, positive polarity), a 10 ml syringe and a pump (Pump 11, Harvard Apparatus) with an adjustable flow rate.

PVN Incorporation.

For physisorption, known quantities of $PVN^{AI}$ in solution will be uniformly deposited onto the matrix and allowed to dry overnight. For in situ processing, the $PVN^{AI}$ will be dispersed in the polymer solution prior to electrospinning. Aliquots of $PVN^{AI}$ and free AI (as a control) are mixed between 10-20 weight % solutions of polymer in a compatible solvent system.

Chemical Conjugation of Loaded PVNs onto Polymeric Substrate.

The well-defined nano-scale topographical features of PVN lend themselves to the possibility of surface grafting. Our aim with this PVN incorporation method is to uniformly tether PVNs on the solid substrates while preserving their active delivery properties. This work is being evaluated on cellulose substrates using both N-hydroxysuccinimide (NHS) substrate activation and 2) maleimide substrate activation.

Coupling to Lysine Residues of Viral Capsids.

Cellulose is initially treated with carboxymethylated cellulose (CMC) to allow adsorption. The CMC-modified cellulose, cellulose matrix, is next reacted with N-hydroxysuccinimide (NHS)/1-ethyl-3-[3-dimethylamino-propyl] carbodiimide hydrochloride (EDC) to form a NHS activated surface. PVN-$(NH_2)_x$ is next reacted with the NHS activated surface to chemically link the cellulose matrix to the PVN.

Coupling to Cysteine Residues of Viral Capsids.

CMC-modified cellulose as the model polymer is coupled to cysteine residues of viral capsid using a thiol-maleimide reaction.

In another set of experiments, the cellulose matrix is reacted with (3-aminopropyl)-triethoxysilane (3-APTES) to introduce a tether having a terminal amino group. The product is then reacted with succinimidyl-4-(N-maleimidomethyl)cyclohexane-1-carboxylate (SMCC) to form a maleimide activated surface. In the next reaction, PVN-$(SH)_x$ is chemically linked to the cellulose matrix via a thiol-maleimide reaction. The advantage of these chemical reactions is that they are done under conditions (temperature and pH) that will not affect the structural integrity of the virion.

Fluorescence Release.

Due to the chemical diversity of compounds and biodiversity of nematodes, answering this question is a complex task. To simplify the task, the initial testing used a model nematode organism, *C. elegans*, and fluorescent test compounds. Due to the complex life cycle of plant nematodes, a model organism, *C. elegans* was chosen for ease of culture and its extensively characterized biology (Nematode website). Likewise two well characterized PVN formulations containing Rhodamine and Ethidium Bromide (Loo, 2008) were chosen as test compounds.

The first round of experiments focused on comparing the uptake of dye from both PVN and free formulations dosed to the nematode culture. Analysis of the images, indicated several important points regarding the bioavailability of fluorescent cargos:

1) When dosed with comparable amounts of dye in PVN or free formulations the nematodes become stained to similar intensities. Images suggest a slightly higher level of staining in the PVN dosed cultures.

2) While multiple experiments showed the bioavailability of the dyes to *C. elegans*, attempts to accurately quantify the differences proved difficult.

3) Staining of worms by either formulation is dose dependent.

4) Comparison of white and fluorescent light images of nematodes dosed by the two formulations indicated that most but not all worms were stained.

5) Maximum staining of the worms by both formulations occurred within a 12-24 hour timeframe.

Activity to *C. elegans* and *M. hapla*.

A key property that must be evaluated in the PVN formulations is the bioavailability of the candidate compound. In an adaptation of a previously reported method, the bioavailability of compounds carried by PVNs is determined by a liquid culture *C. elegans* bioassay.

*Escherichia coli* strain OP50 is transferred to *E. coli* broth (Difco) and incubated at 37° C. for 24 hr with shaking. Ten milliliters of this *E. coli* culture is added to M9 buffer (100 ml) containing 5 mg ampicillin (a bacteriostat) and 10,000 units of nystatin (a fungicide). The resulting medium is stirred at room temperature for 2 hr to produce the test medium.

Nematodes are rinsed from Nematode Growth Medium plates and concentrated to 1 nematode/microliter. One hundred nematodes are added to each well of a 24-well culture plate along with 800 µl of test medium. Finally, 100 µl test solution (free compound or formulated PVN) is added and the entire contents of each well are mixed thoroughly. Free ABM is used as a positive control while sterile water serves as a negative control. Nematodes are examined through a dissecting microscope to determine nematode movement and behavior at 2, 24, 48 and 72 hr post treatment. The bioavailability of AI with non-paralytic activity can be determined by monitoring nematode behavior and reproduction. Candidate compounds that exhibit activity in the *C. elegans* bioassay are further evaluated for juvenile RKN motility in the same bioassay minus the *E. coli*. All experiments are run in triplicate, first with *C. elegans*, and then with RKN.

Soil Mobility.

Test columns are prepared by creating a 4 to 15 cm bed of soil in a 1×20 cm column (Bio-Rad). After a frit is placed on top of the soil bed, the column is conditioned with distilled water until a steady drip is obtained. The test is initiated by the addition of 500 µl of test formulation. The mobility of the formulation is determined by addition of 24 to 48 additional 500 µl aliquots of distilled water that are collected in a 48 well microtiter plate. Collecting in this format allows for easy analysis of the eluted aliquots. This experiment is depicted in FIG. 4. The elution aliquots are added at 5 minute increments to provide a baseline to compare general differences in mobility between the soils.

Figure 5:
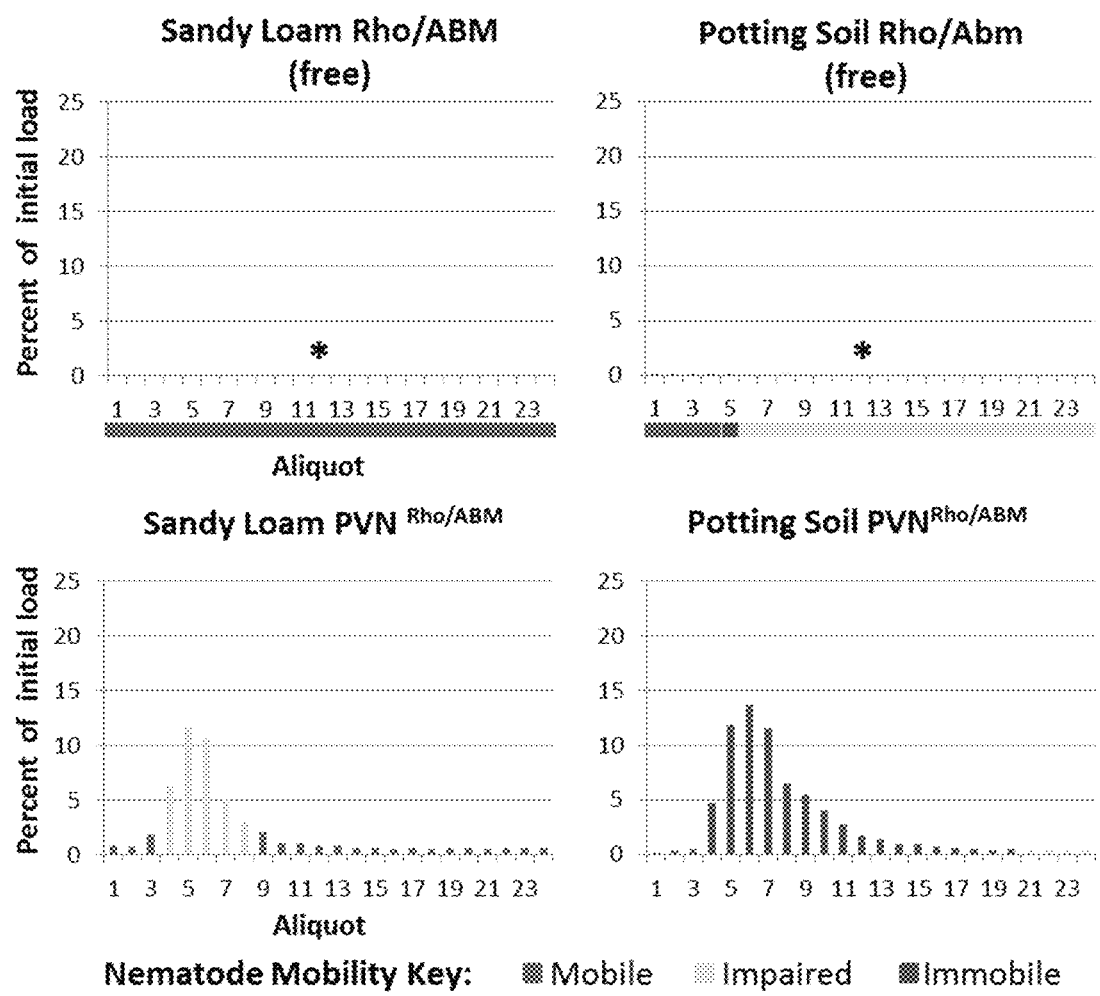
FIG. 5. Improved soil mobility of Abamectin via PVNs.

In a separate set of experiments, the elution aliquots are added once per day (over a period of several weeks to months) to assess how additional residence time within the soil affects mobility. While the initial two experiments are performed with sterile soil, further tests are performed with active (e.g. non-sterile) soil to determine biological influences on soil mobility in addition to soil physical and chemical properties. To evaluate the movement of the AI, a modified nematode bioassay is performed. The test aliquots are placed in separate wells of a 96 well plate along with 50 μl aliquots of *C. elegans* (about 200 individuals). The assay is scored for nematode mobility. FIG. 5 depicts the improved soil mobility of Abamectin via PVNs.

Application to Tomato Seedlings.

Nematodes cause major damage to seedlings, and as such seed treatment is the logical and effective method to control early infections and damage. However, there are several potential drawbacks to seed treatments for nematode control, including potential lack of mobility of AI to provide adequate root-zone protection and lack of persistence over time due to environmental or microbial factors in the soil. We are examining the persistence of PVN formulations with $PVN^{ABM}$ as the initial formulation in both sterile and live soils to determine both duration and zone of protection using a time point-bioassay system.

Figures 6A, 6B:
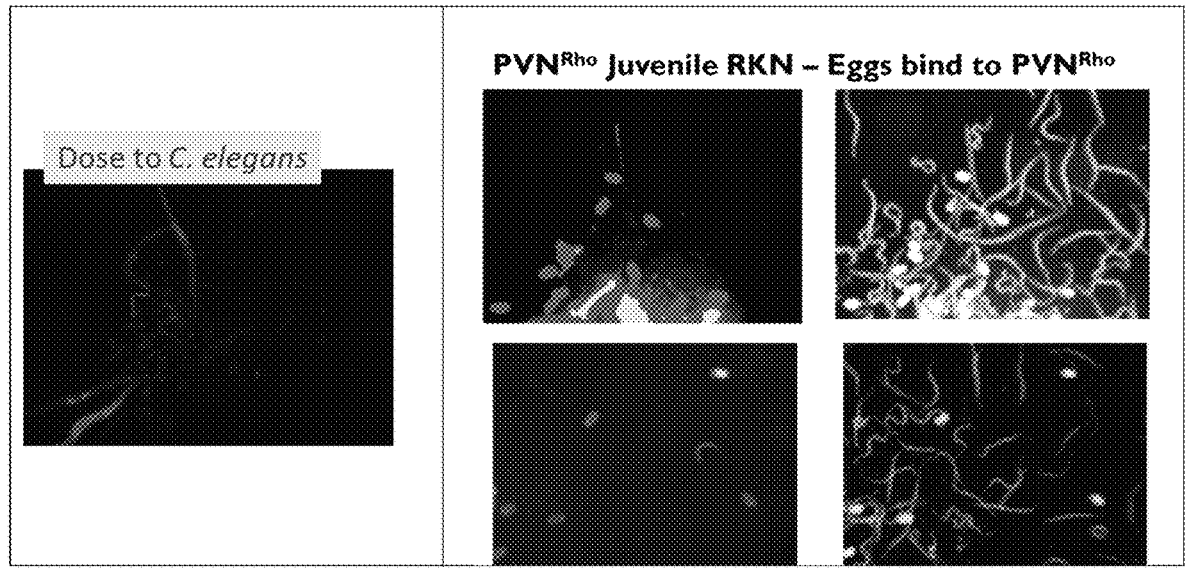
FIGS. 6A-6B. (A) Dosing Nematodes with $PVN^{Rho}$. (B) juvenile RKN and RKN eggs are bound to $PVN^{Rho}$.

Two hundred fifty cubic centimeters of soil are aliquoted into 300 cc containers for establishment of time point experiments with the addition of the following liquid applications: RCNMV, free ABM (or AI) and $PVN^{ABM}$ (or $PVN^{AI}$). The soil is then dosed with an RKN inoculum (5000 eggs in 1 ml per container) followed by transplantation of tomato seedlings beginning at the first application (time zero). Each test condition sample is harvested at 30 days after RKN inoculation/tomato seedling transplantation and evaluated for nematode protection. FIG. 6a depicts the dosing of $PVN^{Rho}$ to Nematodes. In FIG. 6Bb, Juvenile RKN and RKN eggs are bound to $PVN^{Rho}$.

Determine Release and Functions of PVN from Hybrid PVN-Matrix.

Figure 7:
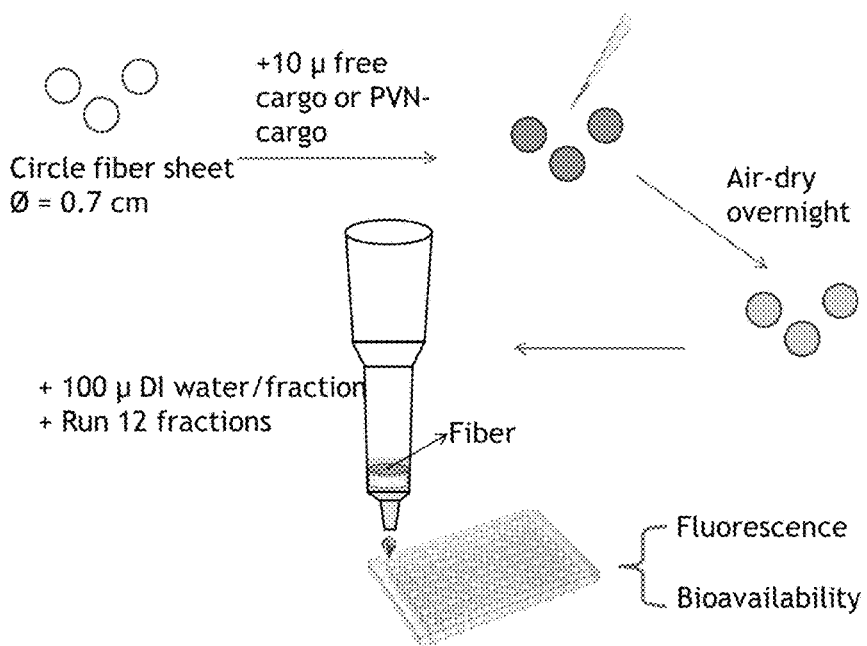
FIG. 7. Overview of experimental design.

After non-chemical incorporation, the release behaviors of PVN particles from matrix are tested by a filtration assay. A PVN loaded matrix is placed as a filter paper in a column. Sequentially, a total of 12 fractions of water flow through the testing matrix and are collected separately in the wells of a 96-multiwell plate. The amount of released PVNs in each fraction is measured by spectrophotometry or HPLC according to the loading cargo in PVNs. The experimental design is depicted in FIG. 7. Moreover, for PVN-biodegradable polymer matrix, in vitro degradation is established to measure its degradation and relevant release behavior of PVNs. The active PVN-matrix is immersed in a release buffer. At the designated time point, the amount of PVNs released in the buffer are determined as previously mentioned, while the degree degradation of matrix is determined by dry-weight change. Different release profiles of PVN-matrix system are correlated to the chemical composition, surface chemistry and morphology of supporting matrices. The morphology and integrity of released PVNs is observed by DLS and agarose gel electrophoresis. If PVNs is loaded with bioavailable cargo, the active assay of released PVNs is evaluated according to specific cargo. Completion of these studies is expected to provide a scientific platform for the designed release of PVN via its interaction with different supporting matrices.

The foregoing is illustrative of the present invention, and is not to be construed as limiting thereof. The invention is defined by the following claims, with equivalents of the claims to be included therein.

That which is claimed is:

1. A method of reducing nematode parasitism and nematode damage in a plant, comprising applying an agricultural composition to a seed or a root of the plant in a treatment effective amount, the agricultural composition comprising:
    hollow nanoparticles having a core and an encapsulating coat or shell, wherein said hollow nanoparticles are nonpathogenic plant virus particles;
    a carrier comprising inert or biodegradable polymer fibers to which said nanoparticles are covalently coupled to an outer surface of the inert or biodegradable polymer fibers, wherein the inert or biodegradable polymer fibers are woven or nonwoven and comprise a biodegradable polymer selected from a cellulose, cotton, wood chips, wood pulp, hydroxypropyl cellulose, carboxymethyl hydroxyethyl cellulose, hydroxyethyl cellulose, hydrophobically modified cellulose, methylcellulose, lignin-sulphite waste liquors, and any combination thereof; and
    a nematicidal active ingredient in the core of said hollow nanoparticles.

2. The method of claim 1, wherein said plant is a monocot or dicot.

3. The method of claim 1, wherein said plant is selected from the group consisting of wheat, corn (maize), soybean, cotton, cassava, potato, sweet potato, bananas, citrus, strawberries, tomato, coffee, carrots, peppers, turf grass, and greenhouse ornamentals.

4. The method of claim 1, wherein said nematode is selected from the group consisting of Meloidogyne root knot nematodes, Globodera and Heterodera cyst nematodes; Pratylenchus lesion nematodes, Dietylenchus stem and bulb nematodes, Tylenchulus citrus nematodes, Xiphinema dagger nematodes, Radopholus burrowing nematodes, Rotylenchulus reniform nematodes, Helicotylenchus spiral nematodes, and Belonolaimus sting nematodes.

5. The method of claim 1, wherein said plant is selected from the group consisting of wheat, corn (maize), soybean, cotton, cassava, potato, sweet potato, bananas, citrus, strawberries, tomato, coffee, carrots, peppers, turf grass, greenhouse ornamentals, taro, oats, barley, cereal rye, breadfruit, pea, rice, yams, garbanzo (chickpea), Jerusalem artichoke, and lentil.

6. The method of claim 1, wherein the agricultural composition is in the form of a pre-formed fabric sheet or a liquid.

7. The method of claim 1, wherein applying the agricultural composition to the seed or the root of the plant comprises coating the seed and/or treating soil around the seed with the composition.

8. The method of claim 7, wherein treating the soil comprises contacting the soil with the composition using drip irrigation, sprinklers, soil injection, soil drench or spraying of the composition.

9. The method of claim 7, wherein coating the seed comprises mixing the seed with the composition or spraying the composition onto the seed.

10. The method of claim 1, wherein said fibers are nonwoven.

11. The method of claim 1, wherein said fibers are configured to extend in length at least two times their length.

12. The method of claim 1, wherein said carrier further comprises water.

13. The method of claim 1, wherein said nematicidal active ingredient is selected from the group consisting of avermectin, oxamyl, ethoprop, carbofuran and fenamiphos, or any combination thereof.

14. A method of reducing nematode parasitism and nematode damage in a plant, comprising applying an agricultural composition to a seed or a root of the plant in a treatment effective amount, the agricultural composition comprising:

hollow nanoparticles having a core and an encapsulating coat or shell, wherein said hollow nanoparticles are viral nanoparticles that are selected from the group consisting of Tombusviridae, Comaviridae, and Bromoviridae virus particles;

a carrier comprising inert or biodegradable polymer fibers to which said nanoparticles are covalently coupled to an outer surface of the inert or biodegradable polymer fibers, wherein the inert or biodegradable polymer fibers are woven or nonwoven and comprise a biodegradable polymer selected from a cellulose, cotton, wood chips, wood pulp, hydroxypropyl cellulose, carboxymethyl hydroxyethyl cellulose, hydroxyethyl cellulose, hydrophobically modified cellulose, methylcellulose, lignin-sulphite waste liquors, and any combination thereof; and a nematicidal active ingredient in the core of said hollow nanoparticles.

15. The method of claim 14, wherein said hollow nanoparticles are red clover necrotic mosaic virus particles.

16. The method of claim 14, wherein the agricultural composition is in the form of a pre-formed fabric sheet or a liquid.

17. The method of claim 14, wherein applying the agricultural composition to the seed or the root of the plant comprises coating the seed and/or treating soil around the seed with the composition.

18. The method of claim 14, wherein said nematicidal active ingredient is selected from the group consisting of avermectin, oxamyl, ethoprop, carbofuran and fenamiphos, or any combination thereof.

19. The method of claim 14, wherein said nematode is selected from the group consisting of Meloidogyne root knot nematodes, Globodera and Heterodera cyst nematodes; Pratylenchus lesion nematodes, Dietylenchus stem and bulb nematodes, Tylenchulus citrus nematodes, Xiphinema dagger nematodes, Radopholus burrowing nematodes, Rotylenchulus reniform nematodes, Helicotylenchus spiral nematodes, and Belonolaimus sting nematodes.

20. The method of claim 14, wherein said plant is selected from the group consisting of wheat, corn (maize), soybean, cotton, cassava, potato, sweet potato, bananas, citrus, strawberries, tomato, coffee, carrots, peppers, turf grass, greenhouse ornamentals, taro, oats, barley, cereal rye, breadfruit, pea, rice, yams, garbanzo (chickpea), Jerusalem artichoke, and lentil.

* * * * *